United States Patent
Tooher et al.

(10) Patent No.: US 12,069,623 B2
(45) Date of Patent: Aug. 20, 2024

(54) SYSTEMS AND METHODS OF OPERATING WITH DIFFERENT TRANSMISSION TIME INTERVAL (TTI) DURATIONS

(71) Applicant: INTERDIGITAL PATENT HOLDINGS, INC., Wilmington, DE (US)

(72) Inventors: J. Patrick Tooher, Montreal (CA); Paul Marinier, Brossard (CA); Ghyslain Pelletier, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/509,749

(22) PCT Filed: Sep. 8, 2015

(86) PCT No.: PCT/US2015/048895
§ 371 (c)(1),
(2) Date: Mar. 8, 2017

(87) PCT Pub. No.: WO2016/040290
PCT Pub. Date: Mar. 17, 2016

(65) Prior Publication Data
US 2017/0290008 A1    Oct. 5, 2017

Related U.S. Application Data

(60) Provisional application No. 62/047,610, filed on Sep. 8, 2014, provisional application No. 62/204,380, filed on Aug. 12, 2015.

(51) Int. Cl.
*H04W 72/0446* (2023.01)
*H04L 1/00* (2006.01)
(Continued)

(52) U.S. Cl.
CPC ....... *H04W 72/0446* (2013.01); *H04L 1/0003* (2013.01); *H04L 1/0007* (2013.01);
(Continued)

(58) Field of Classification Search
CPC ........... H04W 72/0446; H04W 72/042; H04W 52/146; H04L 1/1893; H04L 1/1887; H04L 1/0007; H04L 1/0003; H04L 1/1896
(Continued)

(56) References Cited

U.S. PATENT DOCUMENTS

2003/0152062 A1*  8/2003  Terry .................... H04L 1/1845
                                                            370/349
2005/0063347 A1*  3/2005  Sarkkinen ............... H04L 69/22
                                                            370/342
(Continued)

FOREIGN PATENT DOCUMENTS

EP    1077576 A1    2/2001
EP    1594246 A2    11/2005
(Continued)

OTHER PUBLICATIONS

Definition of "format" from Google dictionary (Year: 2019).*
(Continued)

*Primary Examiner* — Nguyen H Ngo
(74) *Attorney, Agent, or Firm* — CONDO ROCCIA KOPTIW LLP

(57) ABSTRACT

Devices and techniques for determining a transmission time interval (TTI) duration and/or varying the TTI duration are contemplated. The TTI duration may be varied based on one or more of: the timing of a transmission, the amount of data available for transmission, or the type of data to be transmitted. The TTI duration may be for one or more of: the Enhanced Physical Downlink Control Channel (EPDCCH),
(Continued)

the Physical Downlink Shared Channel (PDSCH), and/or the Physical Uplink Control Channel (PUCCH). One or more different TTI durations may be achieved by modifying OFDM symbols per TTI and/or symbol duration (e.g., subcarrier spacing). One or more variable time-slot boundaries are contemplated. TTI duration per set of subcarriers is contemplated. One or more timing rules to deal with different processing time(s) are contemplated.

10 Claims, 11 Drawing Sheets

(51) Int. Cl.
*H04L 1/1867* (2023.01)
*H04W 52/14* (2009.01)
*H04W 72/23* (2023.01)

(52) U.S. Cl.
CPC .......... *H04L 1/1887* (2013.01); *H04L 1/1893* (2013.01); *H04L 1/1896* (2013.01); *H04W 52/146* (2013.01); *H04W 72/23* (2023.01)

(58) Field of Classification Search
USPC .... 370/229, 230, 230.1, 252, 328, 329, 330, 370/458, 468, 508
See application file for complete search history.

(56) References Cited

U.S. PATENT DOCUMENTS

| | | | |
|---|---|---|---|
| 2006/0007886 A1* | 1/2006 | Lee | H04W 28/06 370/329 |
| 2007/0189235 A1* | 8/2007 | Chandra | H04B 7/0413 370/335 |
| 2009/0109908 A1* | 4/2009 | Bertrand | H04L 5/0051 370/329 |
| 2011/0299513 A1* | 12/2011 | Suzuki | H04L 5/0007 370/338 |
| 2012/0320846 A1* | 12/2012 | Papasakellariou | H04W 72/044 370/329 |
| 2013/0003604 A1* | 1/2013 | Blankenship | H04L 5/0053 370/255 |
| 2013/0195031 A1* | 8/2013 | Hessler | H04L 1/1819 370/329 |
| 2013/0250924 A1 | 9/2013 | Chen et al. | |
| 2014/0071915 A1 | 3/2014 | Papasakellariou et al. | |
| 2014/0071954 A1* | 3/2014 | Au | H04W 72/0446 370/336 |
| 2014/0185545 A1 | 7/2014 | Strzyz et al. | |
| 2014/0328260 A1* | 11/2014 | Papasakellariou | H04L 1/1887 370/329 |
| 2014/0362758 A1 | 12/2014 | Lee et al. | |
| 2015/0009952 A1* | 1/2015 | Berggren | H04W 72/042 370/330 |
| 2015/0085794 A1* | 3/2015 | Chen | H04B 7/0413 370/329 |
| 2016/0036618 A1* | 2/2016 | Einhaus | H04L 27/34 370/329 |
| 2016/0081077 A1 | 3/2016 | Li et al. | |
| 2017/0164363 A1* | 6/2017 | Zhang | H04L 1/00 |

FOREIGN PATENT DOCUMENTS

| | | |
|---|---|---|
| JP | 2001112067 A | 4/2001 |
| JP | 2013-236260 A | 11/2013 |
| WO | WO 2006105005 A2 | 10/2006 |
| WO | WO 2007025160 A2 | 3/2007 |
| WO | 2009/126902 A2 | 10/2009 |
| WO | 2013/015606 A2 | 1/2013 |
| WO | WO 2013112703 A2 | 1/2013 |
| WO | 2014/025228 A1 | 2/2014 |
| WO | 2014/040531 A1 | 3/2014 |
| WO | 2014/055878 A1 | 4/2014 |
| WO | 2014/133320 A1 | 9/2014 |

OTHER PUBLICATIONS

3GPP TS 36.212 V11.1.0 (Dec. 2012) 3rd Generation Partnership Project; Technical Specification Group Radio Access Network; Evolved Universal Terrestrial Access (E-UTRA); Multiplexing and channel coding (Release 11) (Year: 2012).*
3GPP specification status report as of Aug. 29, 2021, retrieved from http://www.3gpp.org/DynaReport/status-report.htm (Year: 2021).*
$3^{rd}$ Generation Partnership (3GPP) TSGR1#18(01)0079, "Variable TTI proposal for HSDPA", Lucent Technologies, TSG-RAN Working Group 1, Boston, U.S.A., Jan. 15-19, 2001, 5 pages.
$3^{rd}$ Generation Partnership (3GPP), TSGR1-01-0128, "Text proposal on HARQ complexity to TR25.848 Rev. 1", Nokia, TSG-RAN Working Group 1 Meeting No. 18, Jan. 15-18, 2001, 8 pages.
3rd Generation Partnership Project (3GPP), R1-150575, "Design Considerations on LAA Design", MediaTek Inc., 3GPP TSG RAN WG1 Meeting #80, Athens, Greece, Feb. 9-13, 2015, pp. 1-6.
3rd Generation Partnership Project (3GPP), R1-124227, "Configuration of the Starting Symbol for EPDCCH", New Postcom, 3GPP TSG RAN WG1 Meeting #70bis, San Diego, USA, Oct. 8-12, 2012, pp. 1-2.
$3^{rd}$ Generation Partnership Project (3GPP), TS 36.211 V12.1.0, "$3^{rd}$ Generation Partnership Project; Technical Specification Group Radio Access Network; Evolved Universal Terrestrial Radio Access (E-UTRA); Physical channels and modulation (Release12)", Mar. 2014, 120 page.
$3^{rd}$ Generation Partnership Project (3GPP), TS 36.212 V12.0.0, "$3^{rd}$ Generation Partnership Project; Technical Specification Group Radio Access Nework; Evolved Universal Terrestrial Radio Access (E-UTRA); Multiplexing and channel coding (Release 12)", Dec. 2013, 88 pages.
$3^{rd}$ Generation Partnership Project (3GPP), TS 36.213 V12.1.0, "$3^{rd}$ Generation Partnership Project; Technical Specification Group Radio Access Network Evolved Universal Terrestrial Radio Access (E-UTRA); Physical layer procedures (Release 12)", Mar. 2014, 186 pages.

* cited by examiner

SYSTEMS AND METHODS OF OPERATING WITH DIFFERENT TRANSMISSION TIME INTERVAL (TTI) DURATIONS

CROSS-REFERENCE TO RELATED APPLICATIONS

This application is the National Stage Entry under 35 U.S.C. § 371 of Patent Cooperation Treaty Application PCT/US2015/048895, filed Sep. 8, 2015, which claims the benefit of U.S. Provisional Patent Application No. 62/047,610, filed Sep. 8, 2014, and U.S. Provisional Patent Application No. 62/204,380, filed Aug. 12, 2015, the disclosures of all of which are hereby incorporated by reference as if fully set-forth herein in their respective entirety, for all purposes.

BACKGROUND

Automatic Repeat Request (ARQ) and Hybrid Automatic Repeat Request (HARQ) are techniques that may be used for error checking and/or correcting for errors, such as those that occur during signal transmission. Latency in wireless networks may be caused by one or more, or multiple, factors, which may include the use of HARQ.

SUMMARY

A wireless transmit/receive unit (WTRU) comprises a processor programmed to execute instructions, saved in computer memory, comprising determining the transmission time interval (TTI) duration and/or decreasing the TTI duration. The WTRU processor may be programmed to decrease (and/or vary) the TTI duration based on one or more of: the timing of a transmission, the amount of data available for transmission, and/or the type of data to be transmitted. The transmission time interval duration may be for one or more of: the Enhanced Physical Downlink Control Channel (EPDCCH), the Physical Downlink Shared Channel (PDSCH), and/or the Physical Uplink Control Channel (PUCCH).

TTI duration may be achieved, for example, by modifying one or more of OFDM symbols per TTI and/or symbol duration (e.g., subcarrier spacing). RE mapping may be based on TTI duration. RE mapping may be a function of a number of OFDM symbols, for example the number of OFDM symbols per TTI. One or more variable time-slot boundaries are contemplated.

TTI duration per set of subcarriers is contemplated. One or more (e.g., additional) timing rules to deal with different processing time(s) are contemplated. One or more (e.g., additional) rules to deal with one or more, or multiple, simultaneous feedback report(s) are contemplated. One or more (e.g., additional) rules for UL scheduling with reduced TTI duration(s) are contemplated.

A wireless transmit/receive unit (WTRU) may comprise a processor. The processor may be configured to determine, dynamically based on one or more factors, a first transmission time interval (TTI) duration. The processor may be configured to determine, dynamically based on the one or more factors, a second TTI duration. The second TTI duration may be different from the first TTI duration. The processor may be configured to assign the first TTI duration to a first channel of one or more channels. The processor may be configured to assign the second TTI duration to a second channel of the one or more channels. The WTRU may comprise a transmitter. The transmitter may be configured to send a first transmission via the first channel within the first TTI duration.

A wireless transmit/receive unit (WTRU) may comprise a processor. The processor may be configured to associate a first transmission time interval (TTI) duration with a first Hybrid Automatic Repeat Request (HARQ) process. The processor may be configured to associate a second TTI duration with a second HARQ process. The second TTI duration may be different from the first TTI duration. The WTRU may be configured to activate at least one of the first HARQ Process, or the second HARQ process. The WTRU may comprise a transmitter. The transmitter may be configured to send a first transmission within at least one of: the first TTI duration using the first HARQ process, or the second TTI duration using the second HARQ process.

A wireless transmit/receive unit (WTRU) may comprise a receiver. The receiver may be configured to receive an Enhanced Physical Downlink Control Channel (EPDCCH). The WTRU may comprise a processor. The processor may be configured to identify a first transmission time interval (TTI) duration based on at least a part of the EPDCCH. The receiver may be configured to receive a first transmission via a Physical Downlink Shared Channel (PDSCH) within the first TTI duration. The WTRU may comprise a transmitter. The transmitter mnay be configured to send a second transmission via a Physical Uplink Shared Channel (PUSCH) within a second TTI duration. The second TTI duration may be different than the first TTI duration.

A wireless transmit/receive unit (WTRU) may comprise a receiver. The receiver may be configured to receive an Enhanced Physical Downlink Control Channel (EPDCCH) configuration. The EPDCCH configuration may include information for one or more EPDCCH search spaces. The WTRU may comprise a processor. The processor may be configured to assign a first transmission time interval (TTI) duration to a first EPDCCH search space of the one or more EPDCCH search spaces. The processor may be configured to assign a second TTI duration to a second EPDCCH search space of the one or more EPDCCH search spaces. The second TTI duration may be different than the first TTI duration.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be examples and in no way limit the scope of the application. As used herein, the articles "a" and "an", absent further qualification or characterization, may be understood to mean "one or more" or "at least one", for example.

Figure 1A:
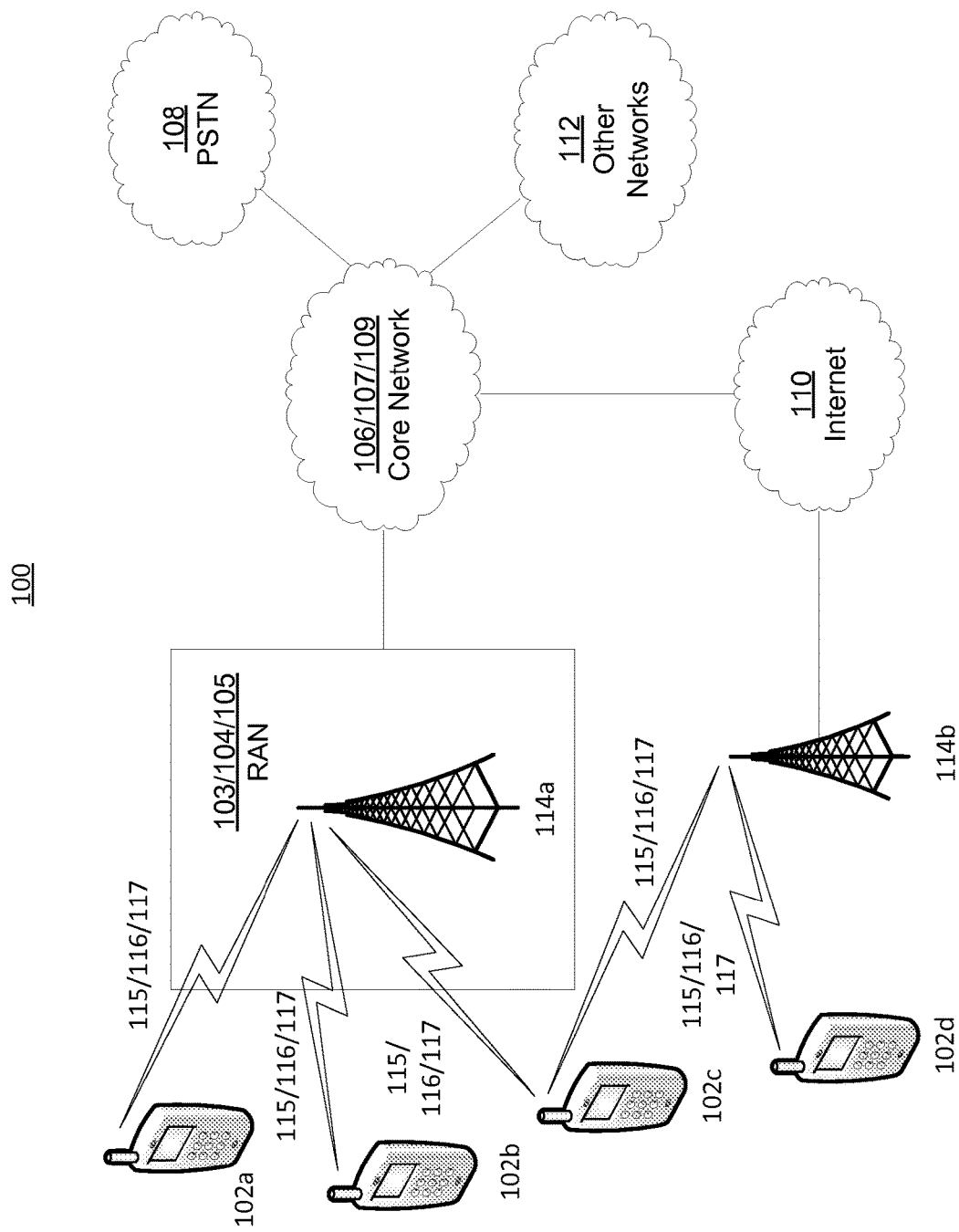
FIG. 1A is a diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
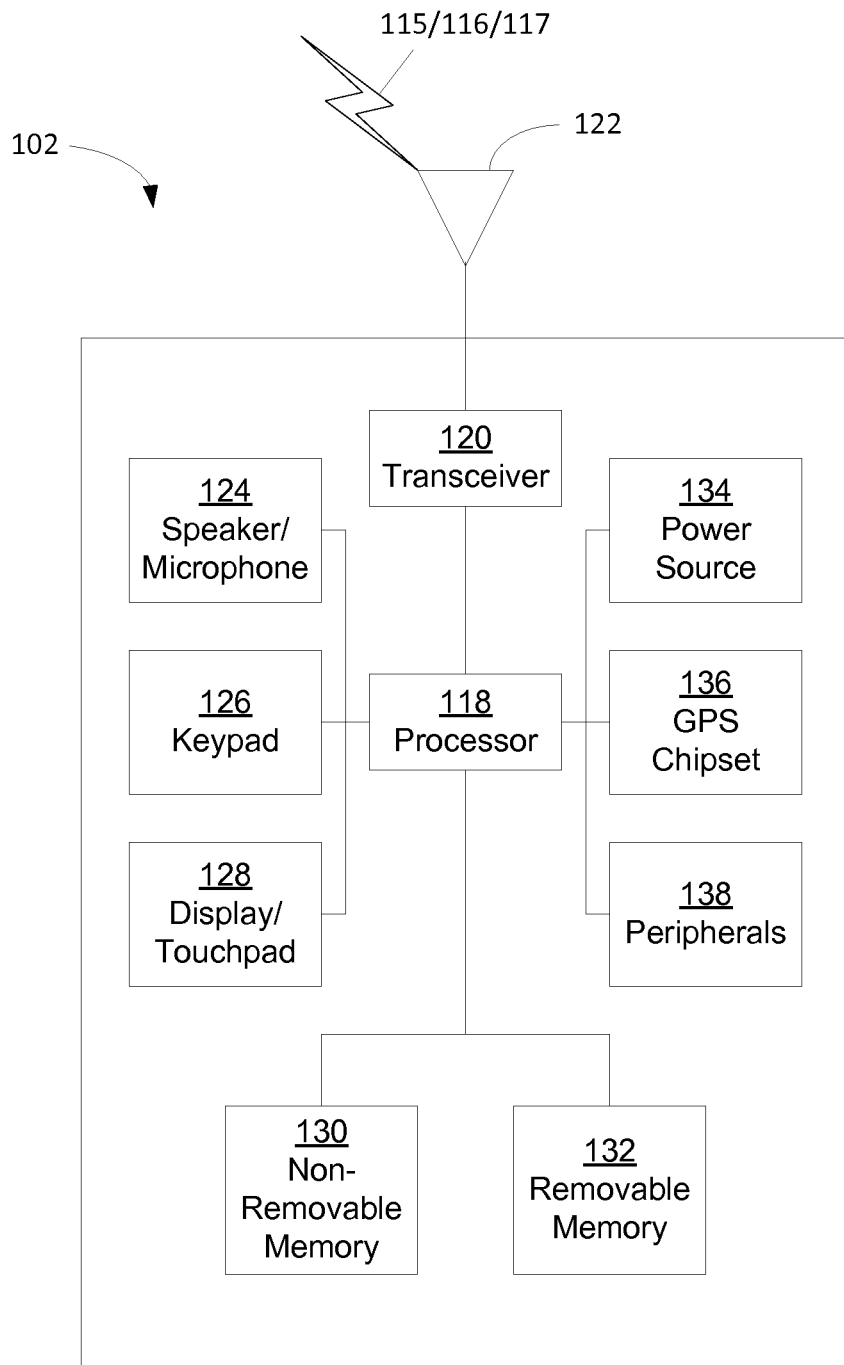
FIG. 1B is a system diagram of an example wireless transmit/receive unit in which one or more disclosed embodiments may be implemented.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
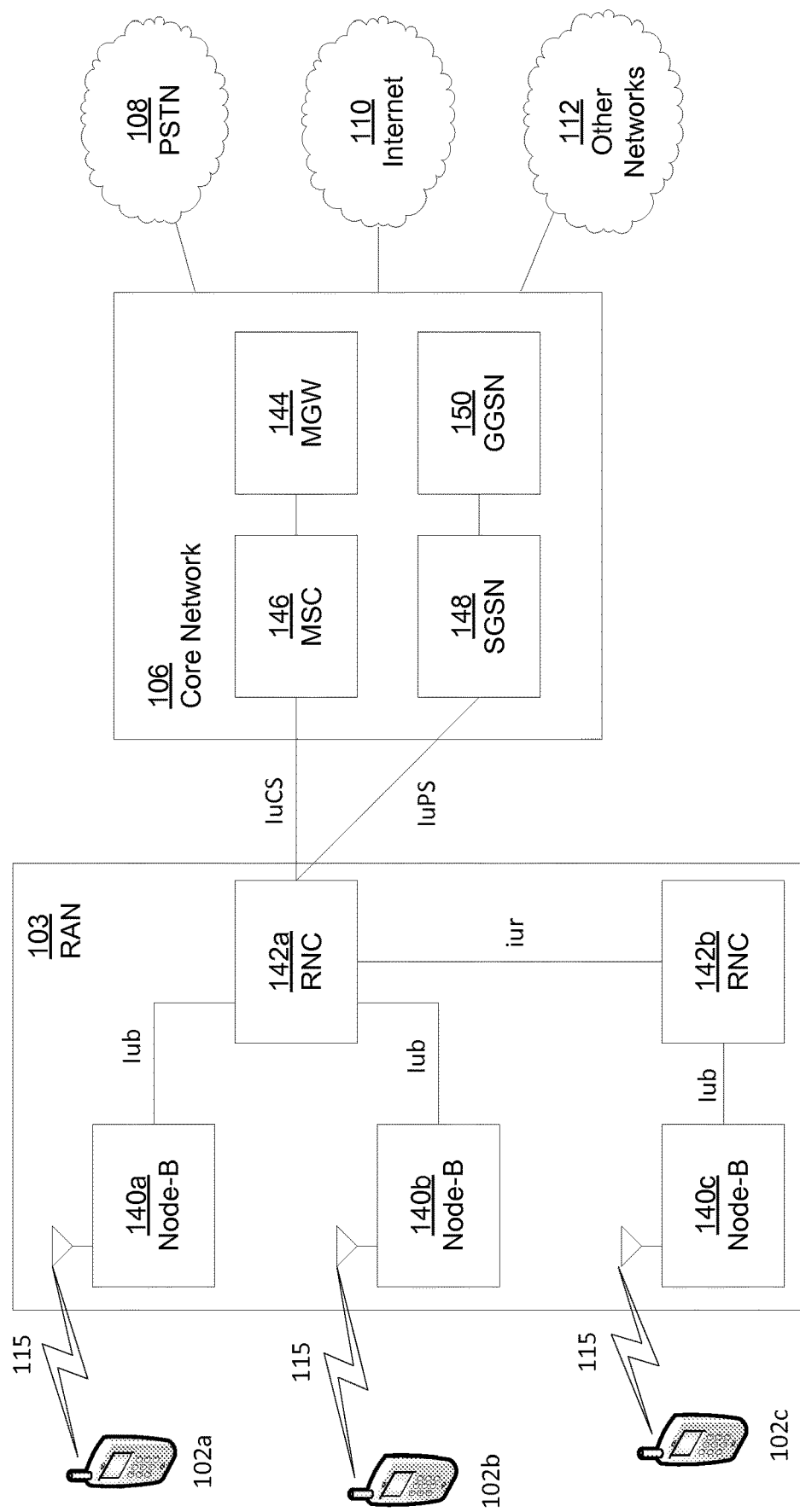
FIG. 1C is a system diagram of a radio access network and core network in which one or more disclosed embodiments may be implemented.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
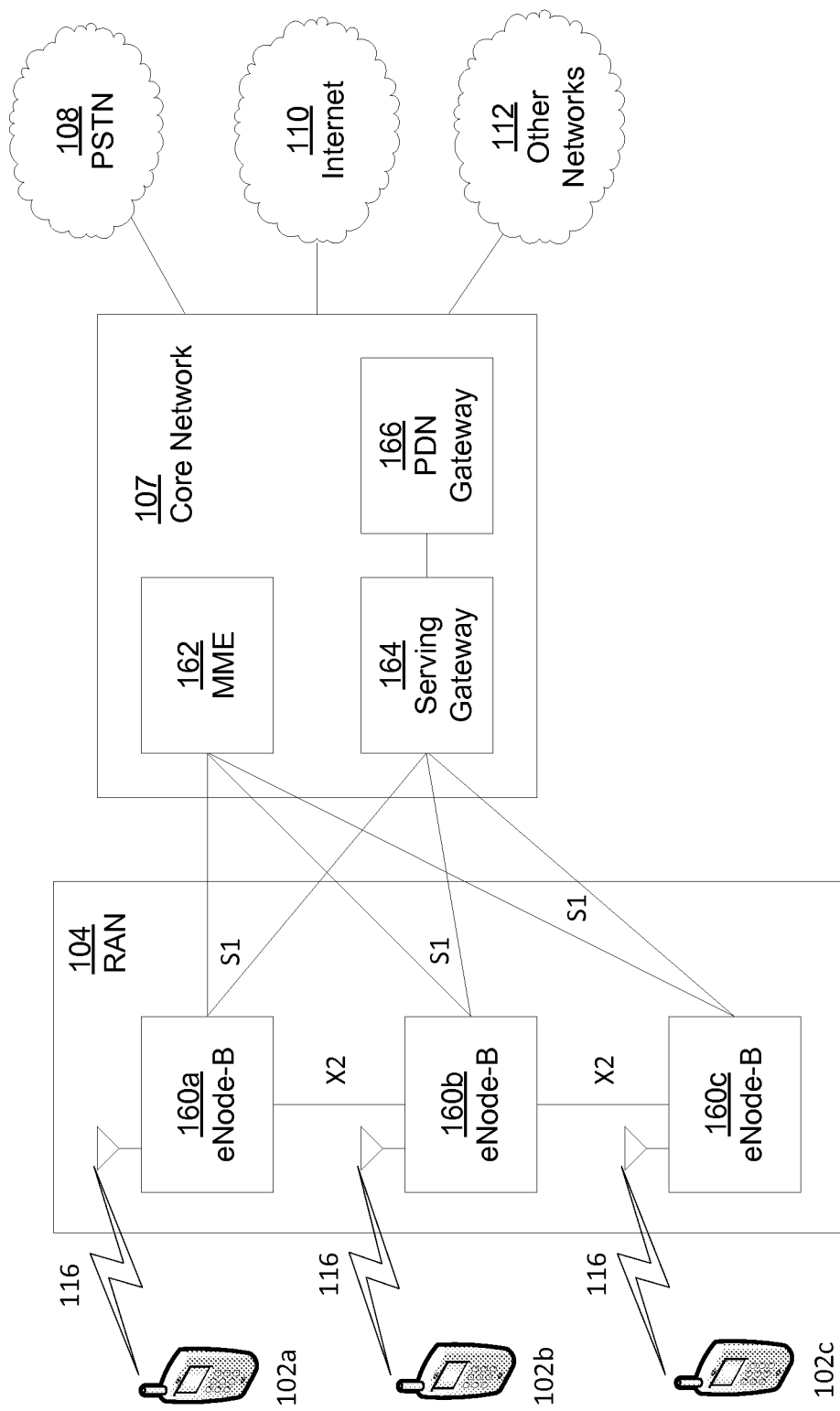
FIG. 1D is a system diagram of a radio access network and a core network in which one or more disclosed embodiments may be implemented.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
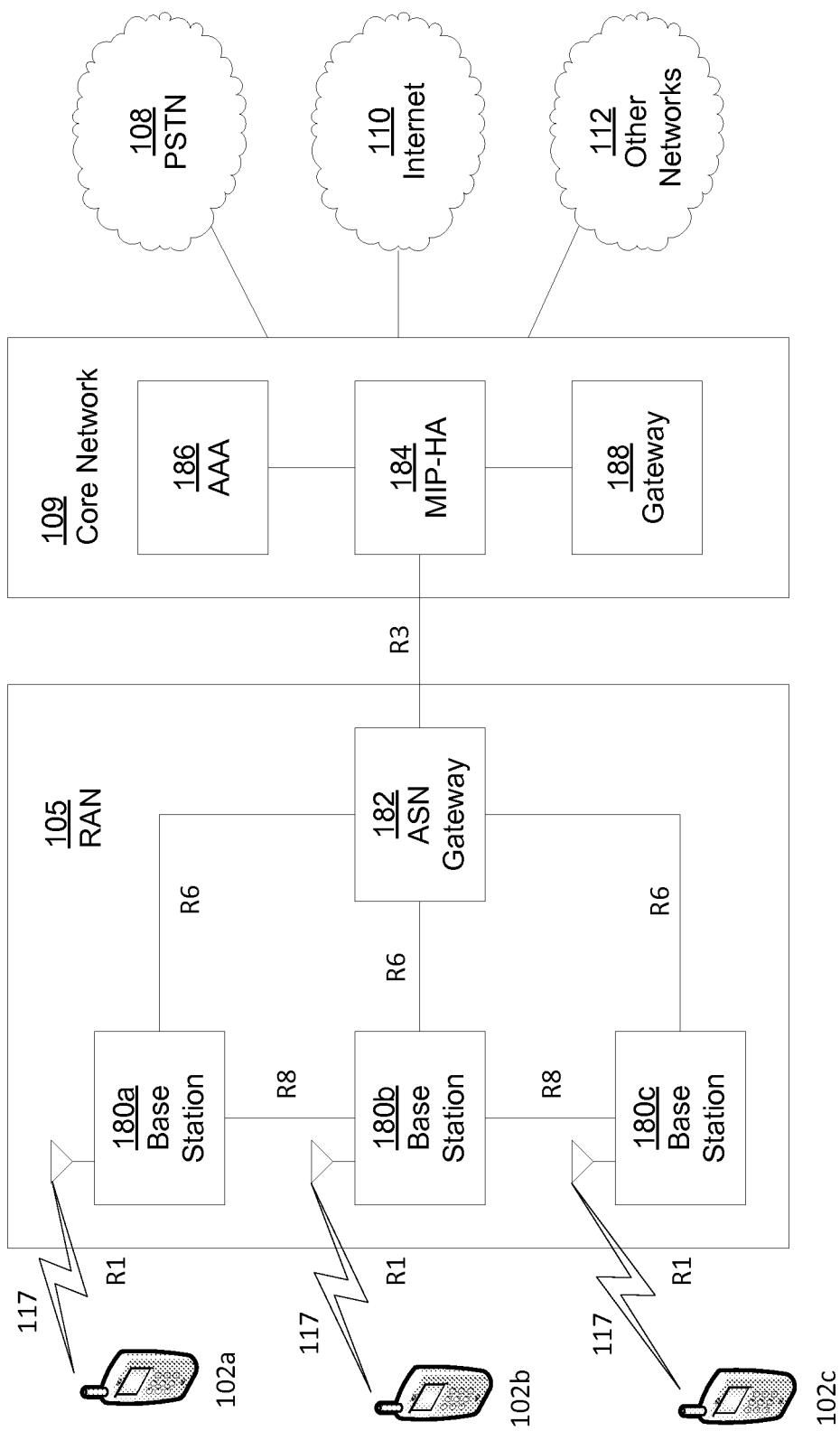
FIG. 1E is a system diagram of the radio access network and the core network in which one or more disclosed embodiments may be implemented.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments recognize one or more components of latency. Once a device can access resources of a communication system, the latency associated to the transmission of useful data may include the addition of one or more of the following components:

The time to perform the transmission of a transport block e.g. a Transmission Time Interval (TTI); and/or Processing time at the receiver (e.g. for decoding of the transmission). This may be tied to implementation complexity and/or may be accounted for using fixed timing relationship between one or more different events associated to the transmission of one data unit. This may include including fixing timing relationship(s), for example in scenarios in which time-division duplex (TDD) may be used for the concerned carrier and/or synchronous HARQ operation (e.g. such as for LTE in the uplink).

In scenarios in which the transmission might not be successfully decoded, among other scenarios, one or more of the following components may apply:

Transmission of feedback e.g. HARQ ACK or NACK;
Processing time at the receiver; and/or
One or more retransmissions (e.g. using similar steps as the above).

One or more, or each of the components described herein may be measured in integer multiple(s) of a basic time interval (BTI). For example, in LTE, one or more, or each, of the components described herein may be measured in TTIs.

Latency in wireless networks may be caused by one or more, or multiple, factors. At lower layers, latency may be affected by the desire for highly reliable transmissions obtained by using Hybrid Automatic Repeat Request (HARQ). One (or more) retransmissions may affect the latency of a transmission given that the retransmissions might not be done in adjacent time periods. For downlink transmissions, some processing time may be useful at the user equipment (UE) or WTRU to determine whether a transmission was decoded properly or not. This may lead to a time interval between reception of a downlink transmission and/or transmission of an Acknowledgement (ACK) or Negative Acknowledgment (NACK) message. Some processing time may be useful at the Evolved Node B (eNB) to determine whether an ACK or NACK was transmitted by the WTRU or UE and/or whether a retransmission may be useful. A similar situation may occur for uplink (UL) transmissions. Processing times may be cumulative. A tradeoff between latency and implementation complexity may be useful.

Perhaps for example in order to accommodate the processing times, among other scenarios, the timing relationship between a first transmission for a transport block and its corresponding ACK-NACK HARQ response for the downlink (DL) and/or the uplink (UL) direction may be specified in LTE. The timing relationship between a first transmission and a retransmission for the UL (e.g. the UL only) may be specified in LTE. Time Division Duplexing (TDD) and Frequency Division Duplexing (FDD) DL scheduling timing may be the same. For example, the WTRU may receive the scheduling grant for a Downlink (DL) transmission in the same subframe, and/or transmission time interval TTI.

For Uplink (UL) transmissions in FDD systems, detection may occur of an (E)PDCCH or an (Enhanced) Physical Downlink Control Channel with UL DCI or Uplink with Downlink Control Information format and/or Physical Hybrid-ARQ Indicator Channel (PHICH) transmission in subframe n, that may be intended for the WTRU. The WTRU may transmit the corresponding Physical Uplink Shared Channel (PUSCH) in subframe n+4. For UL transmission in TDD systems, detection may occur of an (E)PDCCH with UL DCI format and/or PHICH transmission in subframe n, that may be intended for the WTRU. The WTRU may transmit the corresponding PUSCH in subframe n+k. The value of k may depend on one or more of: the TDD UL/DL configuration, the subframe where the UL DCI and/or PHICH was transmitted, TDD UL/DL configuration 0, the PHICH resource, and/or the most significant bit (MSB) or least significant bit (LSB) of the UL index in the (E)PDCCH.

For FDD, a HARQ ACK/NACK response for a DL or UL transmission in subframe n may be provided in subframe n+4. For TDD, a HARQ ACK/NACK response for a DL or UL transmission in subframe n may be provided in subframe n+k, where k may depend on the value of n and/or the TDD UL/DL configuration, for example. For TDD, bundling may be used to provide HARQ for one or more, or multiple, transmissions, for example.

The processing time available to the WTRU may depend on the value of the timing advance, which may depend on the distance between the WTRU and the eNB. An example scenario for LTE may be a distance of 100 km, which may correspond to a maximum timing advance of 0.67 ms. There may be approximately 2.3 ms left for the terminal processing. For the eNB, the processing time available may be 3 ms and may be of the same order as that of the terminal.

Figure 2:
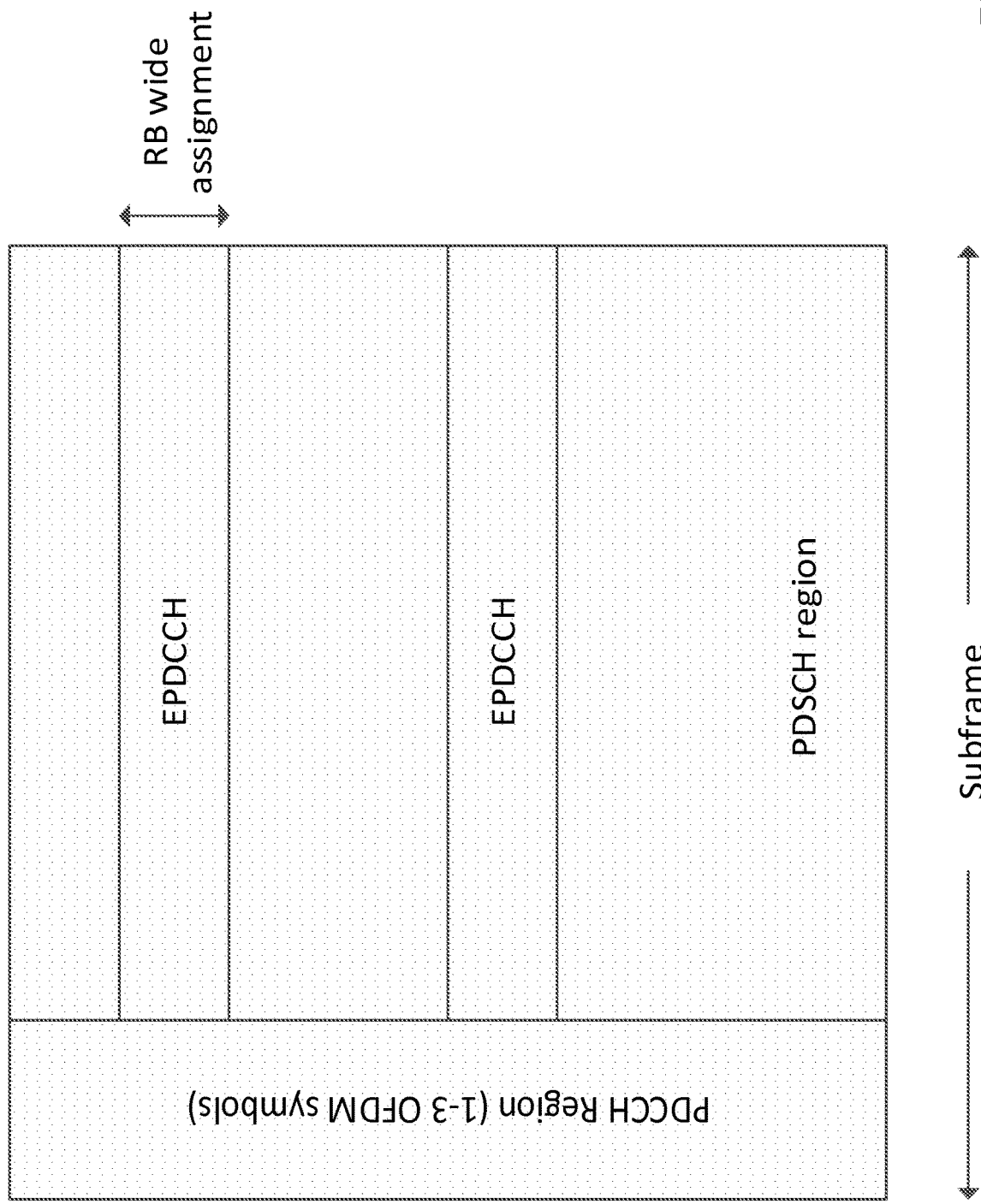
FIG. 2 depicts example physical layer channels that may be used in one or more embodiments.

Physical layer channel location may be provided. In the DL, there may be three (or more, or less) channel areas in a subframe to support DL-SCH and UL-SCH: the Physical Downlink Control Channel (PDCCH) (which may include the Physical Control Format Indicator Channel (PCFICH) and Physical Hybrid-ARQ Indicator Channel (PHICH)), the Physical Downlink Shared Channel (PDSCH), and/or the EPDCCH, (e.g., the PDCCH Region, PDSCH region, and EPDCCH are shown in FIG. 2). The EPDCCH may include scheduling information for a WTRU and/or may take advantage of the benefits of the PDSCH region, which may include beamforming gain, frequency domain ICIC, and/or improving the PDCCH capacity.

Figure 3:
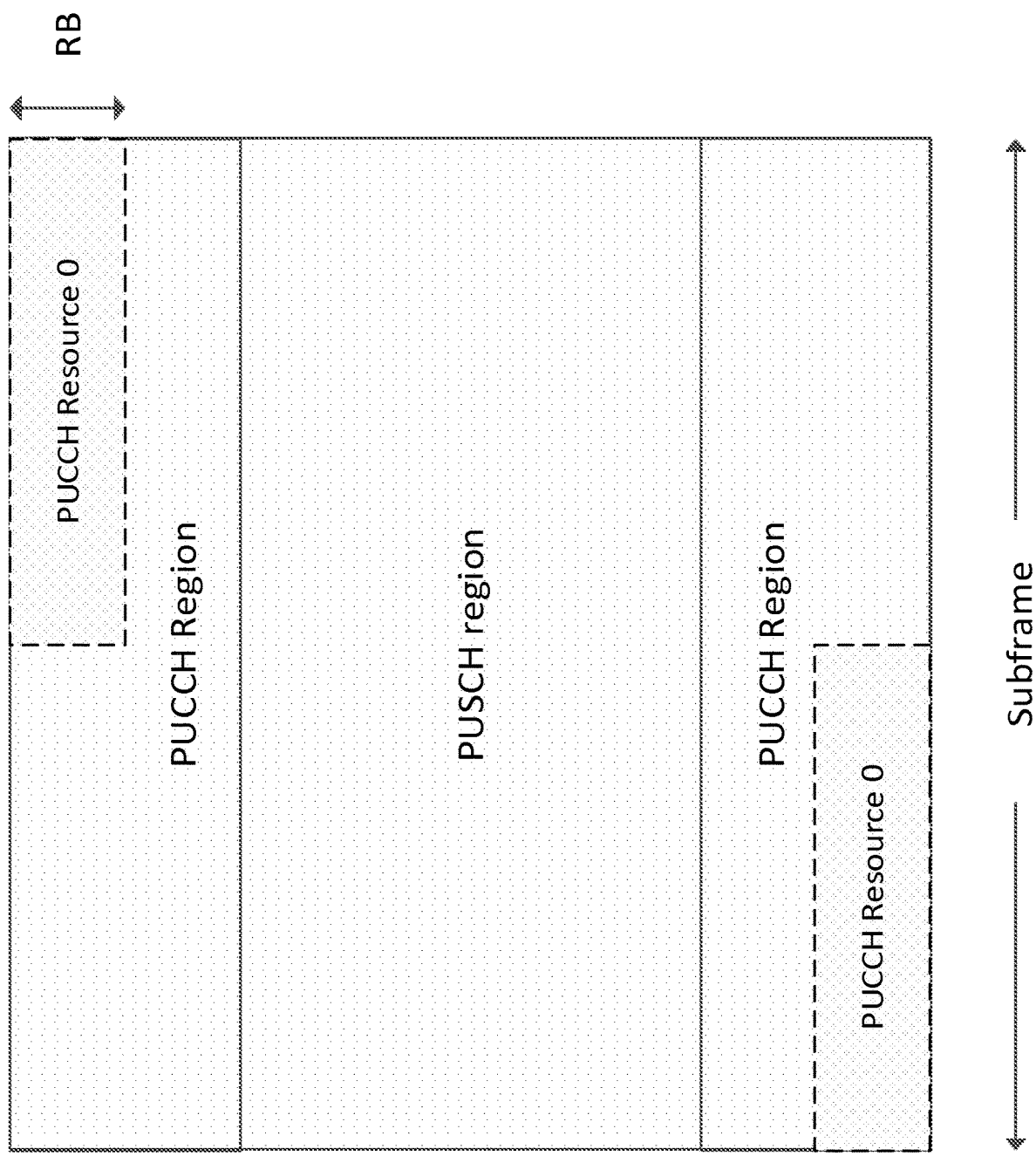
FIG. 3 depicts example uplink physical layer channels that may be used in one or more embodiments.

In the UL, two (or more, or less) channel areas in a subframe may support DL-SCH and UL-SCH: the PUSCH, as shown in FIG. 3, and/or the PDSCH. One or both of these channels may be transmitted in different RBs in one or more, or each, time slot (e.g., frequency hopping of PUSCH) perhaps to increase robustness in frequency selective channels, for example.

Perhaps for example to improve latency, among other reasons, it may be beneficial to decrease and/or vary the TWI duration of different channels, such as the physical layer channels referenced herein. This may enable a decrease in WTRU processing time and/or may provide the ability for a WTRU to begin processing data sooner. This may enable shorter HARQ timeline(s). Different channels may have different TTI duration. There may be shorter than subframe EPDCCH, PDSCH, PUCCH, and/or PDSCH TTI duration. Embodiments may enable effective HARQ feedback for PDSCH and/or PUSCH transmissions, perhaps for example using shorter than subframe TTI durations. One or more techniques are contemplated for the reduction of one or more of the latency components described herein.

The TTI duration may be defined in terms of number of OFDM (Orthogonal Frequency Division Multiplexing) symbols. For example, a TTI duration may be defined as an entire subframe or a pair of resource blocks (PRB or Physical Resource Blocks) (e.g., 14 OFDM symbols for normal cyclic prefix and 12 OFDM symbols for extended cyclic prefix). The TTI may be as short as a single OFDM symbol. The TTI duration may be defined as one or more time slots (e.g., 7 OFDM symbols for normal cyclic prefix and 6 OFDM symbols for extended cyclic prefix). A combination of the above TTI durations can be used.

In one or more techniques, one or more, or all, possible TTI durations may have a fixed number of symbols (e.g. 14 symbols). The symbol time (e.g., duration) may be variable. This can be achieved by modifying the subcarrier spacing. For example, a first TTI duration may be achieved with a first subcarrier spacing and/or a second TTI duration may be achieved with a second subcarrier spacing. Different bandwidth portions (e.g. PRBs) of a carrier may support one or more different subcarrier spacings. This may enable one or more different TTI durations for different bandwidth portions (e.g. PRBs).

A hybrid technique of achieving variable TTI durations (e.g., by using a different number of symbols and/or different symbol durations) may also be used.

The subcarrier spacing per bandwidth portion (and/or per carrier) may be static. The subcarrier spacing per portion (and/or per carrier) may be indicated in a broadcasted signal (e.g. a MIB and/or SIB). The subcarrier spacing may be determined implicitly from the presence of a certain type and/or a characteristic of a synchronization channel and/or reference signal. For example, a first CRS configuration may be present in a first set of PRBs having a first TTI duration, and/or a second CRS configuration may be present in a second set of PRBs having a second TTI duration.

The subcarrier spacing may be semi-statically indicated to a WTRU, for example via RRC signaling. A WTRU may receive an indication for a new (e.g., fresh, updated, and/or heretofore undefined) subcarrier spacing (e.g., possibly one per bandwidth portion) that may be applicable, perhaps for example until a future semi-static indication, among other scenarios. The subcarrier spacing may be tied to a transmission profile.

The subcarrier spacing may be dynamically indicated to a WTRU. For example, an explicit indication of the subcarrier spacing (e.g., possibly per PRB) may be included in a scheduling assignment, and/or a scheduling grant. The subcarrier spacing may be implicitly determined by a WTRU from a parameter of a scheduling assignment or grant.

As described herein, any technique to operate with and/or indicate a TTI duration may be reused as a method to operate with and/or indicate a subcarrier spacing.

The WTRU may determine that it may operate with a specific TTI duration (e.g., subframe TTI duration, time-slot TTI duration). The WTRU may be configured to operate with certain, but different TTI duration, configurations in the downlink and in the uplink. The WTRU may be configured, such that the same TTI duration configuration is used in the downlink and in the uplink for the applicable transmissions.

There may be a WTRU-specific TTI duration, a single duration during a given period. The WTRU may be configured to operate according to one or more, or a plurality, of TTI durations, which may be for (e.g., only for) a specific period of time, (e.g., based on a L3 reconfiguration). The TTI duration may be fixed (e.g., statically, semi-statically, and/or dynamically) for transmissions to and/or from a WTRU (e.g., one or more, or each, transmission to and/or from a WTRU).

There may be one or more, or multiple, TTI durations configured (e.g., concurrently configured). The WTRU may be configured to operate for transmissions of different TTI lengths (e.g., concurrently), which may be based on semi-static allocation (e.g., configuration of a subset of frames/subframes dedicated to different TTI lengths, based on a semi-persistent grant, and/or assignment) and/or on dynamic allocation (e.g., based on detection and/or reception of downlink control signaling).

There may be a Cell/CG-specific TTI duration. Such configuration may be applicable per cell of the WTRU's configuration, for a subset of cells of the WTRU's configuration, e.g., for cells (e.g., all cells) of the same timing advance group (TAG), and/or for cells (e.g., all cells) of the same cell group (CG). HARQ instances associated to a specific MAC entity may be configured with the same TTI duration. Cells (e.g., all cells) associated to the same channel(s) (e.g., PUCCH, PUSCH) for uplink control signaling may use the same configuration for TTI duration.

There may be different channels/signals that may have different TTI durations. There may be a dedicated resource v shared resource. Configuration of TTI duration may be applicable for transmissions (e.g., only for transmissions) that are associated to a dedicated (e.g., WTRU-specific) resource allocation. For example, preamble (re-)transmission(s) on cell-specific Physical Random Access Channel (PRACH) resources may use the legacy TTI duration. A HARQ process for msg3 associated to a contention-based random access procedure may use the legacy TTI duration. Contention-free preamble transmissions may use a configured TTI duration.

There may be channel/signal-specific TTI duration. Different channels and signals may have different TTI durations, e.g., at the same time. For example, PDSCH may be segregated into one or more, or multiple, types depending on the logical channel it services. For example, a PDSCH used for SI may use subframe TTI duration; a PDSCH used for dedicated traffic may use RB time-slot TTI duration. Channels (e.g., one or more, or all, channels) associated with DL-SCH may use a first TTI duration. Channels (e.g., one or more, or all, channels) associated with UL-SCH may use a second TTI duration.

The (E)PDCCH may be of a different TTI duration than a PDSCH. For example, the EPDCCH may be subframe TTI duration, perhaps while the PDSCH may be time-slot TTI duration. The PDCCH for time-slot duration may be located in the first {1,2,3,4} OFDM symbols of a time-slot.

The TTI duration for a channel and/or signal may vary dynamically, for example based on one or more: factors, circumstances, functions, aspects, information, and/or data, etc. One or more, or each, channel and/or signal may be allocated a specific TTI duration, perhaps for example based on one or more of the following. The TTI duration may be based on a semi-static configuration (e.g., by RRC). For example, the WTRU may be configured, such that a specific TTI length may be a function of one or more aspects of the WTRU's configuration (e.g., the TTI duration may be used for one or more cells of the WTRU's configuration). For example, the WTRU may be configured for time-slot TTI duration for (e.g., at least some) transmissions of a Secondary Cell Group (SCG), perhaps when configured with dual connectivity, among other scenarios.

The TTI duration may be based on timing of the transmission (e.g., frame or subframe number). The TTI duration may be based on the logical channel multiplexed into the transport block. The TTI duration may be based on the logical channel of data available for transmission. For instance, the WTRU may initiate scheduling request (SR) transmission over a Physical Uplink Control Channel (PUCCH) of shorter (e.g., time slot) TTI duration, where, for example, data for a configured first subset of one or more logical channels may be available for transmission. The WTRU may initiate SR transmission over a PUCCH of normal (e.g., subframe) TTI duration, where for example, data for a configured second subset of one or more logical channels (e.g., all logical channels not in the first subset of logical channels) may be available for transmission. The TTI duration may be based on the amount of data available for transmission. For instance, the WTRU may determine that the Physical Uplink Shared Control Channel (PUSCH) is transmitted over a short (e.g., 1 slot) TTI duration where, for example, the amount of data is less than a certain fraction of the transport block size that may be determined by the grant for a normal (e.g., 1 subframe) TTI duration. The TTI duration may be based on the type of Uplink Control Information (UCI) to be transmitted. For instance, channel state information (CSI) may be transmitted over PUCCH (or PUSCH) of normal (subframe) TTI duration, while HARQ A/N may be transmitted over PUCCH of shorter (slot) TTI duration, or over resource elements of a single slot in a PUSCH transmission.

The TTI duration may be based on transmission and/or retransmission (e.g., based on NDI), and/or redundancy version. For example, a transmission may use a first TTI duration. A retransmission may use a second TTI duration. This may enable the ability to transmit one or more, or multiple, redundancy versions with a single retransmission. The TTI duration for a retransmission may be based on the TTI duration of the initial transmission. For instance, retransmissions (e.g., all retransmissions) may use the same TTI duration as the initial transmission. The TTI duration may be based on transport block size. For instance, the TTI may be a first duration (e.g., a time slot) in scenarios in which the transport block size is below a threshold, and/or a second value in scenarios in which the transport block size is above a threshold. The TTI duration may also be based on the Rank (e.g., number of transmission layers), the number of transport blocks to be transmitted, a measurement of path loss, and/or of RSRP of the serving cell, and/or dynamic signaling. For instance, for measurement of path loss, among other scenarios, the WTRU may initiate a PRACH transmission of a first duration, and/or associated to a first TTI duration, perhaps for example if the path loss is below a threshold, and/or may initiate a PRACH transmission of a second duration, and/or associated to a second TTI duration, perhaps for example if the path loss is higher than a threshold.

One or more, or each channel and/or signal may be allocated a specific TTI duration based on one or more of the following, such as a resource block and/or subband. For example, the center 6 RBs may use a first TTI duration. Other RBs may use a second TTI duration. In such scenarios, among others, a value of the shorter TTI durations may be a divisor of the duration of the longer TTI, perhaps to ensure synchronization between TTIs at, at least some, TTI borders. For example, the TTI duration of the center 6 RBs may be 1 ms, whereas perhaps for one or more, or all, other RBs, the TTI duration may be 0.5 ms. This may ensure that one or more, or every, second short TTI may be aligned with the border of a long TTI.

One or more, or each channel and/or signal may be allocated a specific TTI duration based on one or more of the following, such as a subcarrier spacing. The TTI duration, perhaps as measured in number of symbols and/or in time, may depend on the subcarrier spacing of the bandwidth portion on which a channel may be located and/or on which a transmission may be taking place.

One or more, or each channel and/or signal may be allocated a specific TTI duration based on one or more of the following, such as the presence, and/or a parameter of, a reference signal. For example, the presence of legacy DM-RS may indicate a first TTI duration, whereas perhaps the presence of a new (e.g., fresh, updated, and/or heretofore undefined) and/or enhanced DM-RS may indicate a second TTI duration. The enhanced DM-RS may reuse legacy DM-RS parameters and/or may differ from legacy DM-RS by new (e.g., fresh, updated, and/or heretofore undefined) RE locations within the TTI.

One or more, or each channel and/or signal may be allocated a specific TTI duration based on one or more of the following, such as the presence, and/or a parameter of, one or more specific channel(s). For example, a TTI duration may be tied to the presence, or lack thereof, of a control channel. For example, the TTI duration may be tied to a parameter of a control channel (e.g. the number of OFDM symbols for a PDCCH).

The TTI duration may be based on dynamic signalling. One or more of the following may apply.

A WTRU may perform blind detection to determine the TTI duration of a channel (e.g., WTRU monitors search spaces for different TTI durations of (E)PDCCH. The WTRU may dynamically determine the length of the TTI as a function of one or more of: RNTI used for the successful blind decoding of a DCI, the search space in which the WTRU performed the decoding of the DCI, the aggregation level of the DCI, the first Control Channel Element or CCE of the DCI, and/or the first symbol associated with the decoding of the DCI. When the WTRU successfully decodes a DCI in a UE-specific search space (UESS) configured for DCIs related to a given TTI duration, while a second UESS may indicate a second TTI duration. The WTRU may determine that a DCI decoded in a common search space indicates a transmission of a first (e.g., subframe) TTI duration, while a DCI decoded in a UESS indicates a transmission of a second (e.g. time slot) duration. The WTRU may determine that a DCI decoded with a first RNTI may be for a transmission according to a first TTI duration, while a DCI decoded with a second DCI may be for a transmission according to a second TTI duration.

The TTI duration of a scheduled and/or granted resource may be (e.g., dynamically) indicated in the (E)PDCCH. For example, it may be indicated by the grant and/or by the assignment (e.g., dynamically scheduled and/or configured) in a DCI received on (E)PDCCH. For example, it may be indicated a DCI received in a RAR (e.g., when the WTRU performs a contention-free random access (CFRA), and/or when the preamble used for the RACH procedure might not be selected by MAC.

The TTI duration of an expected feedback (for example PUCCH for HARQ ACK/NACK) may be signaled in the grant and/or assignment of the original transmission.

The TTI duration of an expected feedback (for example PUCCH for HARQ ACK/NACK) may be determined by the TTI duration of the associated transmission.

The TTI duration for at least an RACH message 3 may be indicated in a RACH response message. The WTRU may determine the TTI duration, as a function of within which, of a plurality of, RAR reception widows the RAR is received. Different windows may correspond to different TTI durations. For example, the WTRU may determine that a transmission (e.g. either the RAR itself and/or the transmission associated to the grant in the RAR) is of a first TTI duration, if it receives the RAR in a window that corresponds to X ms immediately following the last transmission of a preamble. The WTRU may determine that is it associated to a second TTI duration otherwise (e.g., in a window that may exclude those X ms).

Figure 4:
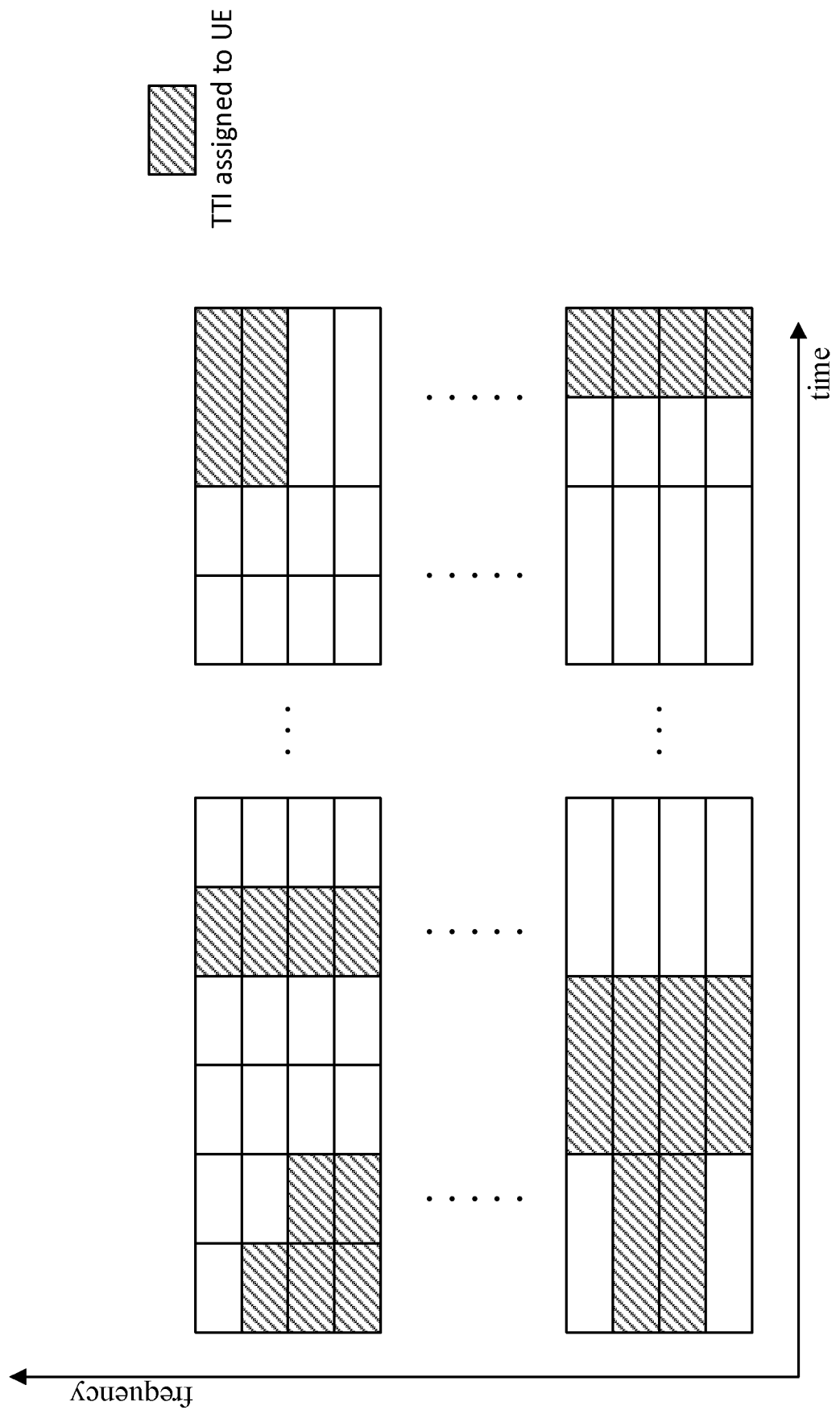
FIG. 4 depicts an example of different TTI durations in one or more different subframes and/or in one or more different bandwidth portions.

FIG. 4 shows an example of a WTRU being assigned DL resources with different TTI duration(s). The assignments with one or more, or multiple, TTI durations may be simultaneous. One or more, or multiple, TTI durations may be defined per set of resource blocks (e.g. bandwidth portion)—as illustrated in the left part of FIG. 4—or may vary over time in a set of resource blocks—as illustrated in the right part of FIG. 4.

Embodiments contemplate TTI duration symbol mapping.

The TTI duration might not be fixed for adjacent TTIs. For example, a first TTI may be composed of X OFDM symbols, and/or a second TTI may be composed of Y symbols, where X and Y might not be equal. Shortened TTI duration may be designed without any TTI-boundary synchronization to legacy TTI duration. For example, a first TTI may include X symbols (e.g. X=7 symbols), and/or a second adjacent TTI may be composed of Y symbols (e.g. Y=8 symbols). The combined first and second TTIs might not share boundaries with legacy TTI duration (e.g., where legacy TTI duration is 14 symbols).

A set of shortened TTIs may be designed, for example to ensure that the set may have boundaries matching those of legacy TTIs. For example, a first TTI may include 7 symbols, and/or a second TTI may include 7 symbols. The first symbol of the first shortened TTI may be aligned with the first symbol of a legacy TTI and/or the last symbol of the second shortened TTI may be aligned with the last symbol of the legacy TTI.

The shortened TTI may be applicable to a subset of channels (e.g., only to the subset), for example PDSCH. In such scenarios, among others, the control region (e.g., PDCCH, PCFICH, and/or PHICH) may use legacy TTI timing. The first shortened TTI's PDSCH region may include the last X-C symbols of the TTI (e.g., where X may be the duration in symbols of the first shortened TTI and C may be the duration in symbols of the control region). The second TTI's PDSCH region may be composed of one or more, or all, Y symbols (e.g., where Y may be the second shortened TTI's duration).

Embodiments contemplate legacy TTI duration subdivided into channel-specific shortened TTIs.

A legacy TTI duration may be divided into one or more, or multiple, shortened TTIs. A first shortened TTI may include (e.g., solely include) the control region (say the first C symbols of the legacy TTI duration). A second TTI may include at least a portion of the remaining symbols (e.g., X symbols). A third TTI may include the remaining portion of symbols of the legacy TTI duration. In such scenarios, among others, a shortened TTI may include (e.g., completely include) a control region. Other shortened TTIs may have no control region. The control region TTI may be used to schedule transmissions in the other adjacent TTIs.

For example a legacy TTI duration may be split into, for example, three shortened TTIs. A first shortened TTI of duration C (e.g., C=3) symbols may include (e.g., entirely include) a control region. A second TTI of duration X (e.g., X=5) symbols may include PDSCH and/or relevant reference signals (e.g. DM-RS and CSI-RS). A third TTI of duration Y (e.g., Y=6) symbols may include another PDSCH and/or relevant reference signals (e.g. DM-RS and CSI-RS). The control region of the first TTI may assign downlink resources in the second and/or third TTI.

The scheduling of DL transmissions for one or more, or multiple, and/or possibly shortened TTIs, for example in a control region that may be applicable to one or more, or multiple, PDSCH TTIs, may include dependent and/or reused parameters. For example, a control region TTI may include DL assignments for more than one upcoming TTI. The DL assignment of a first TTI may include one or more, or all, useful parameters (e.g., MCS, RB allocation, downlink assignment index, HARQ process number, precoding information, and/or HARQ-ACK resource offset). A DL assignment for a second TTI that may be included in the same control region may reuse one or more of the aforementioned parameters, perhaps for example without explicitly indicating them. The DL assignment parameters for the second TTI may be obtained as a function of the explicitly indicated parameters of the first TTI. The dependence relationship between parameters of a first and second TTI may be configured semi-statically.

In such scenarios, among others, UL transmissions may include at least two TTIs for transmission per legacy TTI duration. For example, a first UL TTI may be composed of the first seven (7) SC-FDMA symbols and/or a second UL TTI may be composed of the last seven (7) SC-FDMA symbols. For UL scheduling, the control region in the first shortened DL TTI in legacy subframe n, may grant resources in the first and/or second shortened UL TTI of a legacy subframe n+k. K may be predefined and/or may be a function of the TTI duration. For example, for legacy TTI duration, k may be 4. For shortened TTI duration, k may be 2 subframes.

Embodiments contemplate variable Time-Slot Boundary.

A TTI may be determined as being a time slot of a subframe. For example, a first TTI of a subframe may include legacy control, channel region, and/or a PDSCH region. A second TTI of a subframe may include (e.g., may solely include) a PDSCH region.

In one or more techniques, the time slot boundary may be fixed at half the number of OFDM symbols of a subframe. In one or more techniques, the time slot boundary may vary. For example, the WTRU may be configured, possibly semi-statically, with a time slot boundary for reduced TTI transmissions. For example, the time slot boundary may be indicated in a scheduling assignment and/or scheduling grant.

The time slot boundary may be indicated by any techniques described herein for the indication of TTI duration.

The time slot boundary may be obtained implicitly by a WTRU, perhaps for example as a function of transport block size and MCS.

A WTRU scheduled with both time slots (e.g., TTIs) of a subframe may have time slots overlapping on a symbol. For example, a subframe may include 14 OFDM symbols. A first time slot may include the first 8 symbols and/or a first subset of the subcarriers of the 9th symbol. The second time slot may include a second subset (e.g., complementary of the first subset) of the subcarriers of the 9th symbol and/or the last 5 symbols. The size of the subset of subcarriers for one or more, or each, time slot may be determined by the WTRU, perhaps as a function of the transport block size transmitted in one or more, or each, time slot.

A WTRU may be assigned a (e.g., a single) transport block to be transmitted over at least two, possibly adjacent, time slots (e.g., TTIs). The WTRU may segment the transport block accordingly and/or may be expected to feedback one or more, or multiple, HARQ A/N for the transport block (e.g. one per segment). The segmentation may be done according to fixed and/or configurable rules. For example, segmentation may be determined as a function of the transport block size. For example, a transport block may include one or more, or multiple, codeblocks (for example, one or more, or each, possibly individually encoded using, e.g., a turbo encoder). The WTRU may divide the codeblocks into at least two groups (e.g., evenly, in a fixed manner, in a manner semi-statically, and/or dynamically indicated by the eNB). Perhaps depending on the number of REs that may be useful for the transmission of one or more, or each, codeblock, and/or on the number of allocated resource blocks, among other scenarios, a WTRU may determine the useful number of symbols for a first and/or second time slot (e.g., including partial symbols—such as symbols shared by both time slots).

Embodiments contemplate unequal shortened TTI duration RE mapping.

TTIs used for the same channel (for example, TTIs used for PDSCH transmission) may vary in duration, possibly in a fixed pattern, and/or possibly indicated in a control channel. This may lead to different allowable transport block sizes per PDSCH, perhaps for example based on the TTI within which a PDSCH transmission occurs. The transport block size used for a PDSCH transmission may be determined for example based on a function of the MCS provided in the DL assignment and/or the TTI duration of the TTI where the PDSCH transmission occurs, and/or the TTI duration of the TTI where the DL assignment is transmitted. A first MCS/TBS table may be designed for a first TTI duration and/or a second MCS/TBS table may be designed for a second TTI duration. The use of the appropriate table may be determined by the WTRU, perhaps implicitly from knowledge of the TTI duration of the PDSCH transmission.

A first MCS/TBS table may be configured for a first TTI duration and/or a scaling formula may be used to enable the WTRU to determine the appropriate TBS for any other TTI duration.

An example of a scaling formula may be $TBS\_tti2=f(TBS\_tti1)$, where $TBS\_tti2$ may be the transport block size of a second TTI duration. $TBS\_tti1$ may be the transport block size of a default TTI duration obtained from an MCS/TBS table. $F(x)$ may be a preconfigured scaling function, such as $f(x)=floor(tti2/tti1)$, where tti2 is the second TTI duration and/or tti1 may be the first TTI duration. This may enable the WTRU to be able to operate with a greater variety of TTI durations.

The feedback provided by the WTRU may also be dependent on the TTI duration. A feedback may include a TTI duration for which the feedback report is valid. The TTI duration of one or more of: the reference subframe, the measurement trigger subframe, and/or the feedback report subframe may indicate the TTI duration assumed for the feedback report measurement.

HARQ operation may be disclosed. The WTRU MAC may be configured with a separate set of HARQ processes for a configured cell that supports transmissions using different TTI durations.

The WTRU may be configured to use at most one TTI duration in any given subframe/slot. If the WTRU operates such that one or more, or a set of, HARQ processes associated to a specific TTI duration may be active at any given time (e.g., for the applicable cell(s) of the WTRU's configuration), the WTRU may replace one or more, or a set of HARQ processes (e.g., flush) with another one or more, or set, perhaps for example when it reconfigures the TTI length for those cells, among other scenarios. If the TTI length is associated to different timing (e.g., the same subframe number in a frame that reoccurs at a specific period may have the same TTI length, and/or different subframes within a frame may have different TTI length) the WTRU may maintain both sets at the same time. The WTRU may keep some processes unused (or simply not instantiate them, e.g., such that no two overlapping HARQ processes may be active at the same time).

The WTRU may operate with parallel TTI duration. If the WTRU operates such that HARQ processes associated to different TTI durations may be active concurrently (e.g., for the applicable cell(s) of the WTRU's configuration), the WTRU may maintain separate HARQ processes (e.g., what set of HARQ processes is invoked may be a function of the TTI duration determined by the WTRU for the concerned transmission).

The WTRU may extend single connectivity. For example, the WTRU may be configured with a single MAC entity but with different set of HARQ processes. One or more, or each, set of HARQ processes may be associated with its own C-RNTI, where control signaling received according to a first C-RNTI indicate a first TTI duration, and control signaling received according to a second C-RNTI indicates a second TTI duration. The WTRU may be configured, such that WTRU-autonomous uplink retransmissions are not performed for at least one set of HARQ processes, e.g., if a second TTI duration is configured for uplink transmissions.

The WTRU may overload dual connectivity. For example, the WTRU may be configured with one or more, or a plurality, of MAC entities (e.g., one or more, or each, with a set of HARQ processes and/or one or more, or each, associated to a C-RNTI. The WTRU may be configured such that the same carrier (e.g., the same cell) may be used by the one or more, or plurality, of MAC entities, whereby one or more, or each, MAC entity may operate independently of each other and/or may have a different TTI duration. The WTRU may be configured such that WTRU-autonomous uplink retransmissions are not performed for at least one MAC entity, e.g., if a second TTI duration is configured for uplink transmissions.

With the time-slot duration, the WTRU may maintain 8 HARQ process for a HARQ RTT of 4 ms. The WTRU may be configured to receive PDSCH (or transmit PUSCH) in two consecutive TTI's of shorter (e.g., one slot) duration, wherein control parameters associated to the PDSCH (or PUSCH) may be received in a single PDCCH or E-PDCCH. The PDSCH (or PUSCH) transmissions may implicitly be associated to the same HARQ process, and the redundancy versions of one transmission may be a function of the redundancy version of the other transmission. The PDCCH or E-PDCCH may be received in a shorter TTI (e.g., one slot) duration. The WTRU may determine that such type of operation occurs in a subframe based on higher-layer signaling and/or dynamic signaling, for instance based on a property or field of the decoded PDCCH or E-PDCCH.

A WTRU and communication systems may enable short TTI EPDCCH. A WTRU may be configured with EPDCCH search spaces for reduced TTI duration EPDCCH. A WTRU may be configured with EPDCCH search spaces of varying TTI durations. In the configuration of the EPDCCH search space, the network may include the TTI duration of one or more, or each, search space. The WTRU may use blind detection to attempt to decode EPDCCH for varying TTI durations. For example, a WTRU may be configured with an EPDCCH resource defined by a set of ECCEs (enhanced control channel elements) one or more, or each, made up of 9 EREGs (enhanced resource element groups). Perhaps depending on the appropriate TTI duration, for example, the EREGs may map to different REs. A WTRU may attempt blind detection on possible RE mappings (e.g., all possible RE mappings). This may determine if a valid EPDCCH is present.

A WTRU may be configured with search spaces (or sets of search spaces) for one or more, or multiple, TTI durations. Perhaps for example upon being configured with a specific TTI duration, among other scenarios, the WTRU may determine the appropriate EPDCCH search spaces (or sets of search spaces) to attempt detection on. A WTRU may be configured with search spaces (or sets of search spaces) for multiple TTI durations and/or may perform blind detection on search spaces (e.g., all search spaces or sets of search spaces). The TTI duration and/or subset of symbols of the relevant search space may (e.g., implicitly) configure a WTRU to use that (or another) TTI duration and/or subset of symbols for other channels (e.g., for granted or assigned resources).

The TTI duration of E-PDCCH may be linked to the aggregation level (e.g., number of ECCE's) of the search space. For instance, the WTRU may be configured to attempt decoding E-PDCCH candidates with TTI duration of a (e.g., single) time slot for aggregation levels 1 and 2, and E-PDCCH candidates with TTI duration of a subframe for aggregation levels 4 and 8.

In the configured EPDCCH search spaces, the starting OFDM symbol (or set of OFDM symbols) for one or more, or each, search space may be included. The WTRU may have one or more, or multiple, search spaces within a subframe, and one or more, or each, may have different locations in time within the subframe. For example, the WTRU may be configured with a first set of search spaces located (e.g., entirely) within a first time slot and/or a second set of search spaces located (e.g., entirely) in a second time slot. The location of the search spaces may (e.g., implicitly) configure the WTRU with the location of relevant channels (e.g., an EPDCCH detected in a search space in a first time slot may lead to granted and/or assigned resources located within a first time slot).

An EPDCCH search space may be made up of one or more ECCEs. One or more, or each, ECCE may be configured with a TTI duration and/or a set of possible symbols. For example, a first EPDCCH search space may be include ECCE 0 and ECCE 1. These two ECCEs may be configured for time-slot TTI duration and/or for a first time slot. Another EPDCCH search space may include ECCE 2. This ECCE may be configured for time-slot TTI duration, perhaps more specifically for a second time slot. Another EPDCCH search space may be composed of ECCE 4, ECCE 5, ECCE 6 and ECCE 7. These 4 ECCEs may be configured for full subframe TTI duration. One or more, or each, ECCE may be repeated in one or more, or each, TTI. A first EPDCCH located in a first TTI subset of symbols (e.g., a first time slot) may be composed of ECCE 0 and ECCE 1. A second EPDCCH located in a second TTI subset of symbols (e.g. a second time slot) may include ECCE 0 and ECCE 1. The RE mapping of the EREGs of one or more, or each, ECCE may depend on the location of the specific EPDCCH.

The EREGs may be mapped to different REs depending on the TTI duration, e.g., in order to enable a variable TTI duration EPDCCH. For example, for EPDCCH using subframe level TTI duration, the EREGs may be mapped on every 16th RE (e.g., ordered in frequency first and then in time, while skipping over Demodulation Reference Signal (DM-RS) reference elements (REs)). For time slot level TTI duration, the EREG mapping may depend on the set of OFDM symbols used for a specific TTI duration. For example, a TTI duration of a time slot may have two possible mappings for EREGs: one or more, or each, located within the first time slot, or one or more, or each, located within the second time slot. The EREGs may use similar mapping rules as for subframe level TTI duration (e.g., an EREG is located every 16th RE, with REs ordered first in frequency and then in time). The first time symbol for one or more, or each, EREG mapping may be different. The EREGs may be mapped to fewer than 9 REs. For example, in one or more, or each, time slot there are 72 REs (not including DM-RS REs); if an EREG is located every 16th RE, then 8 EREGs may have 5 REs and 8 EREGs may have 4 REs. For reduced TTI, the EREG mapping may depend on the TTI duration. For example, for time slot based TTI duration, the EREG may be mapped to every 8th RE, with REs ordered first in frequency and then in time. This may enable one or more, or each, EREG to be mapped to 9 REs (e.g., all within a single time slot—the time slot affecting the first symbol where the EREG may be mapped to REs). For non-subframe or time slot TTI duration, the WTRU may be configured with allowable EREG to RE mapping.

For distributed Enhanced Physical Downlink Control Channel (EPDCCH), the Enhanced Control Channel Elements (ECCEs) may be mapped to Enhanced Resource-Element Groups (EREGs) in one or more, or multiple, resource blocks (RBs). One or more, or each, of the EREGs of the ECCEs of an EPDCCH search space may be located in the same set of OFDM symbols. Different EREGs may be located in different sets of OFDM symbols.

Scheduling using short TTI EPDCCH may be disclosed. Scheduling of PDSCH assignments or PUSCH grants using EPDCCH may require using the reuse of the same TTI duration for one or more, or each, channel, e.g., described by example with reference to FIG. 5. An EPDCCH located in a subset of symbols may assign (or grant) PDSCH (or PUSCH) resources in the same subset of symbols, e.g., with a fixed time offset. Short TTI duration for EPDCCH may lead to short TTI duration for PDSCH or PUSCH. The size and/or location of a TTI used for EPDCCH may be reused for PDSCH and/or PUSCH. The TTI duration and/or location of the PDSCH or PUSCH might not be tied to the TTI duration and/or location of the EPDCCH. For example, the EPDCCH may be located in a subset of symbols (e.g., a first time-slot); the assigned (and/or granted) PDSCH (and/or PUSCH) resources may be for the entire subframe (e.g., full subframe TTI). The EPDCCH and/or PDSCH and/or PUSCH may use reduced TTI duration. The EPDCCH may be located in (e.g., only in) a first subset of symbols. The EPDCCH in a first subset of symbols may assign (and/or grant) PDSCH (and/or PUSCH) resources in a second subset of symbols. For example, an EPDCCH in a first time slot may assign (and/or grant) PDSCH (and/or PUSCH) resources in a first time-slot and/or a second time-slot, e.g., in a cross-TTI scheduling manner.

Embodiments contemplate EPDCCH spanning one or more, or multiple, TTIs.

A WTRU may be configured with EPDCCH resources that may span one or more, or multiple, TTIs. For example, an EPDCCH resource may be configured for legacy subframe TTI duration. PDSCH may be configured to use time slot TTI duration. For DL scheduling, an EPDCCH resource spanning one or more, or multiple, shortened TTIs may be used, perhaps for example to assign resources to any of the TTIs the EPDCCH may span. A downlink assignment indicated in one or more, or multiple, shortened TTI-spanning EPDCCH may include an index to indicate for which of the shortened TTIs (e.g., located within the same legacy subframe as the EPDCCH) the assignment is for.

Embodiments contemplate the use of EPDCCH DM-RS. Demodulation using DM-RS may be used, e.g., to enable EPDCCH. For shortened TTI duration EPDCCH, DM-RS may be available in some of the symbols of the EPDCCH. For example, for time-slot TTI duration, one or more, or each, time slot may have enough DM-RS to enable 4 ports. The EPDCCH search spaces (e.g., all EPDCCH search spaces) may use spatial multiplexing and the same EREGs may be used for up to four EPDCCH search spaces. For smaller TTI duration, DM-RS may be redesigned to enable DM-RS in OFDM symbols. The set of symbols of a TTI duration may include at least one symbol with DM-RS (e.g., for normal cyclic prefix, symbols 5, 6, 12, 13 of a subframe). For example, with 4 DM-RS symbols, a TTI can be about ¼th of a subframe. By ignoring legacy subframe borders, a first short TTI subset of symbols may be symbols 2, 3, 4 and 5 (with DM-RS in symbol 5), a second short TTI subset of symbols may be symbols 6, 7, 8 (with DM-RS in symbol 6), a third short TTI subset of symbols may be symbols 9, 10, 11, 12 (with DM-RS in symbol 12), and a fourth short TTI subset of symbols may be symbols 13, 0 (of next subframe), 1 (of next subframe) (with DM-RS in symbol 13). In such scenarios, among others, given that DM-RS uses frequency orthogonality to double the number of possible ports, one or more, or each, TTI subset of symbols may have up to 2 DM-RS ports, and one or more, or each, TTI subset of symbols may spatially multiplex 2 EPDCCH search spaces on the same sets of EREGs.

The systems may use asymmetric TTI duration. The TTI duration for UL-SCH may differ from that used for DL-SCH transmissions. For example, DL-SCH may use time-slot TTI duration, whereas UL-SCH may use subframe TTI duration. One or more of the following may be implemented, e.g., to enable such asymmetric TTI duration.

Figure 5:
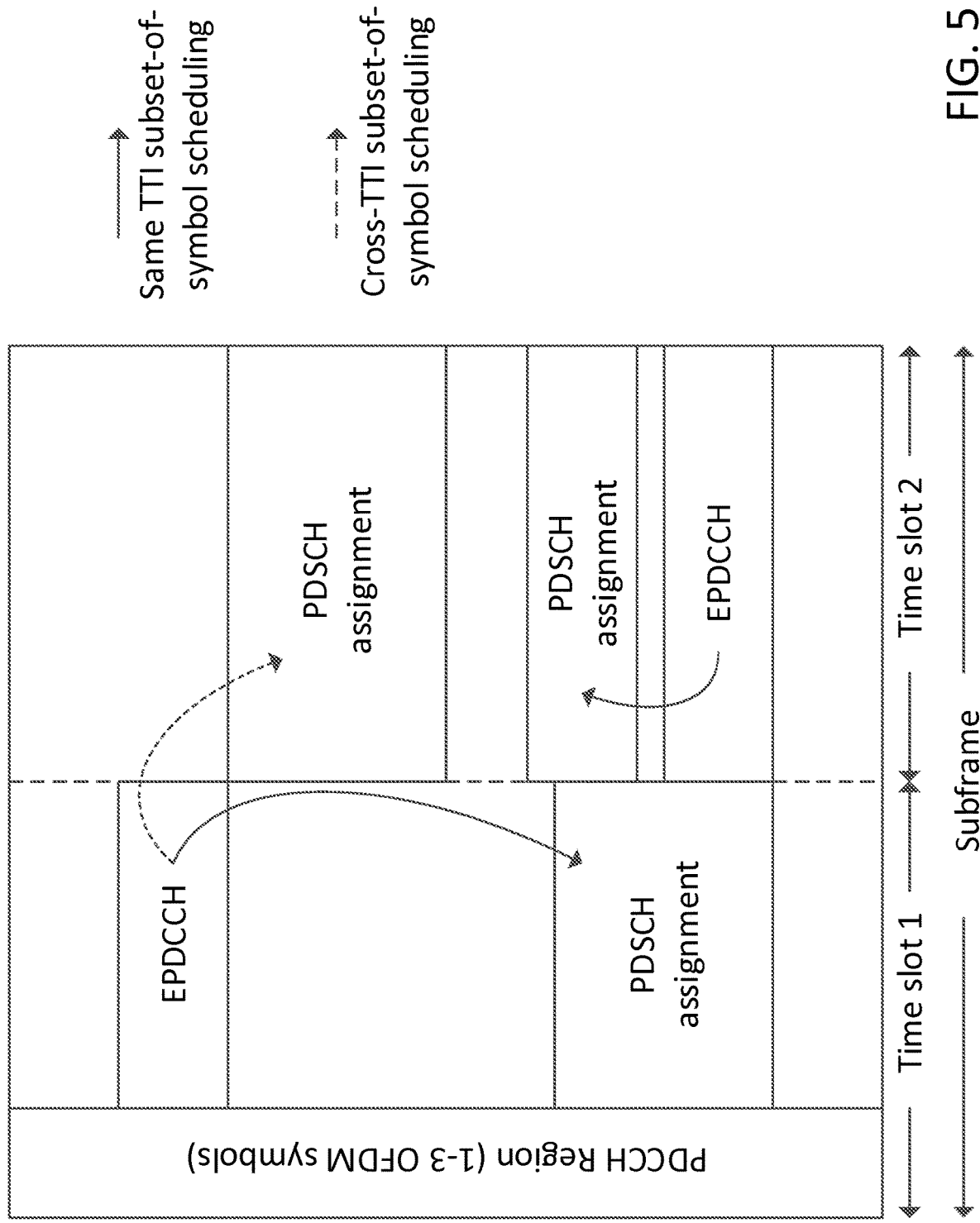
FIG. 5 depicts an example scheduling using short transmission time interval EPDCCH for short transmission time interval PDSCH that may be used in one or more embodiments.

The systems may use short TTI for DL-SCH or subframe TTI for UL-SCH. Reduced TTI DL-SCH scheduling may be achieved by using EPDCCH in a manner described herein. PDCCH may be used to assign PDSCH resources to a WTRU. The (E)PDCCH located at the beginning of a subframe may be used to schedule data in any shortened TTI subset of symbols (e.g., a TTI duration) within the subframe, e.g., as shown in FIG. 5. The (E)PDCCH located at the beginning of the subframe may explicitly indicate to the WTRU the TTI subset of symbols for which a scheduling assignment is relevant. A parameter of the (E)PDCCH located at the beginning of the subframe may indicate the relevant TTI subset of symbols. One or more of the following may be configured to indicate the relevant short TTI subset of symbols of a scheduling assignment, the first (or second) CCE of the DCI, the DCI Format, the PUCCH resources configured for the HARQ ACK-NACK, the Modulation and Coding Scheme (MCS) (e.g., some MCS may be reserved for specific short TTI subset of symbols), and/or the pre-configured PDSCH RE Mapping and Quasi-Co-Location Indicator (PQI).

At the beginning of one or more, or each, short TTI subset of symbols, a PDCCH-like channel may be transmitted. In such scenarios, among others, PDSCH transmissions for a short TTI subset of symbols may be assigned (e.g., only be assigned) by the PDCCH located in one (or many) symbol(s) at the beginning of the short TTI subset of symbols. For example, in single time-slot TTI duration, a PDCCH may be located in the first symbols of one or more, or each, time slot to enable per single time-slot TTI PDSCH assignments.

The systems may use UCI feedback for short TTI DL-SCH. Where ECCEs (e.g., all ECCEs) of a subframe are defined for a specific subset of symbols within the subframe, (for example the first x ECCEs are assigned to the first time slot and the next y ECCEs are assigned to the second time slot), the resources used for HARQ ACK-NACK feedback in subframe n+i can be functions of the first (or second) ECCE of a DCI for PDSCH assignment. In scenarios in which the same ECCE labelling can be used one or more, or multiple, times within a subframe (e.g., one or more, or each, for every short TTI duration), the HARQ ACK-NACK feedback resource may overlap, e.g., if they are solely functions of the first (or second) ECCE of a DCI for PDSCH assignment. In such a situation, the resources used for HARQ ACK-NACK feedback in subframe n+i may be a function of both the first (or second) ECCE of a DCI for PDSCH assignment, as well as a configuration of the symbols used for the EPDCCH. For example, the ACK-NACK feedback resources may be a function of the first (or second) ECCE of a DCI for PDSCH, as well as the first (or second) OFDM symbol used for the ECCEs.

The WTRU may determine the resource for the transmission of PUCCH as a function of the configuration of a separate set of PUCCH resources, including separate PUCCH regions, where one or more, or each, set of resources may correspond to transmissions according to different TTI duration. For a second TTI duration the WTRU may transmit (e.g., only transmit) HARQ ACK-NACK feedback on such PUCCH resource allocation. The WTRU may receive downlink data according to a first TTI length and/or may transmit uplink control information according to a second TTI length (e.g., in scenarios in which the WTRU may have a configuration enabling one or more, or a plurality, of TTI durations concurrently). In such scenarios, among others, the WTRU may select the resource and/or the transmission format for the UCI (e.g., UCI on PUSCH, PUCCH format 1a/1b, and/or PUCCH format 3, etc.) as a function of whether the included UCI is associated to transmission(s) received according to a single TTI length (e.g., using legacy PUCCH format and resource selection) or the included UCI is associated to transmissions received according to one or more, or a plurality, of TTI length (e.g., using an alternative PUCCH format and/or resource).

Perhaps if the WTRU is scheduled with one or more, or multiple PDSCH, e.g., one per shortened TTI subset of symbols, among other scenarios, the WTRU may bundle and/or multiplex its HARQ ACK-NACK feedback into one (or more) feedback resource(s). The feedback resource may be determined from the first (or second) ECCE in the first (or second) shortened TTI subset of symbols. For example, a WTRU scheduled with PDSCH via two EPDCCHs, one in a first time slot and a second in a second time slot, may bundle and/or multiplex the HARQ ACK-NACK feedback into resources determined by the first (and/or second) ECCE of the EPDCCH located in the first (and/or second) time slot.

In scenarios such as where one or more, or multiple, TTI HARQ ACK-NACK feedbacks may be included in the same feedback resource (e.g., by multiplexing and/or bundling), among other scenarios, there may be differences in processing times to generate the appropriate feedback for one or more, or each, TTI. The HARQ ACK-NACK resources may be located in legacy subframe n+k, where n may be the legacy subframe where the first TTI DL transmission is included and/or k may be any integer greater than or equal to 1. For example, if a legacy subframe is divided into two equal-length DL transmission TTIs (e.g., one per time slot), and k=1, (e.g., immediately after) receiving the last symbol of the second slot TTI, a WTRU may start transmitting the HARQ ACK-NACK feedback. Perhaps to enable enough processing time, especially for proper decoding of the second TTI, among other reasons, the TTIs may be offset to be multiplexed and/or bundled into one or more HARQ ACK-NACK feedback. For example, a feedback for a second time slot TTI from subframe n can be combined (e.g., multiplexed and/or bundled) with a feedback for a first time slot TTI from subframe n+1 into a HARQ ACK-NACK feedback report in subframe n+1+k, where k is an integer greater than or equal to 1. Perhaps to deal with uneven processing times, among other reasons, some DL assignment restrictions may be placed on a second TTI transmission, for example because the WTRU may have less time determining the feedback than with a first TTI transmission, among other reasons. One or more restrictions may be indicated by the WTRU in the form of a WTRU capability. One or more restrictions may play a role, perhaps if DL assignment parameters for a second TTI may be determined as a function of the DL assignment parameters of a first TTI transmission, among other scenarios.

Different shortened TTI may have different HARQ timelines. For example, a first set of shortened TTIs may have HARQ ACK-NACK feedback in legacy subframe and/or shortened TTI n+k_1 (e.g., where n may be the legacy subframe and/or shortened TTI where the DL transmission occurred and/or k_1 may be a counter of legacy subframes and/or shortened TTIs). A second set of shortened TTIs may have HARQ ACK-NACK feedback in legacy subframe and/or shortened TTI n+k_2. The sets of TTIs, one or more, or each, with different HARQ timelines, and/or the values of k_1 and k_2, may be configured semi-statically and/or may be cell-specific and/or WTRU-specific. The sets of TTIs and/or the values of k_1 and/or k_2 may be functions of the TTI duration. For example, one or more, or all, TTIs of duration 1 ms may use k_1=4 legacy subframes. For example, one or more, or all, TTIs of duration 0.5 ms may use k_2=4 shortened TTIs=2 legacy subframes.

A WTRU may be configured with a table of HARQ ACK-NACK resources. Within the DCI of the PDSCH assignment, the network may indicate the appropriate ACK-NACK resources for one or more, or each, feedback.

The timing of the HARQ ACK-NACK feedback may be defined as n+i, where "n" may be the subframe number where the PDSCH is transmitted and "i" may be a predetermined offset measured in subframes. For example, "n" may represent a counter of shortened TTI subset of symbols, and/or "i" may be a predetermined offset measured in shortened TTI subset of symbols. For example, for time-slot TTI duration, one or more, or each, time slot within a frame can be numbered and be used for "n" while the value of "i" can be 4 time slots. Combinations of interpretation of "n" (e.g., subframe number, time slot number, OFDM symbol number of a first symbol of the PDSCH) and/or of "i" (e.g., subframes, time slots, OFDM symbols) may be used. A WTRU may be statically and/or semi-statically configured with an interpretation of the feedback timing. A WTRU may be configured with an interpretation of the feedback timing, perhaps for example upon being assigned resources for shortened TTI PDSCH transmissions.

For UCI on PUSCH, the HARQ ACK-NACK may be mapped to the REs adjacent to the UL DM-RS. In scenarios where a single subframe may comprise one or more, or multiple, shortened TTI subsets of symbols, among other scenarios, one or more, or each, HARQ ACK-NACK may be transmitted on PUSCH. The set of HARQ ACK-NACKs may be mapped to REs adjacent to the UL DM-RS, e.g., in a pre-configured manner. For example, a first ACK-NACK may be mapped to REs adjacent to the UL DM-RS (e.g., symbols 2 and 4 as well as symbols 9 and 11, given that UL DM-RS is located in symbols 3 and 10). A second ACK-NACK may be mapped to the REs in the next symbols (e.g., symbols 1 and 5 as well as symbols 8 and 12) and so on. A first ACK-NACK may be mapped around a first UL DM-RS (e.g., symbols 2 and 4). A second ACK-NACK may be mapped to REs around a second UL DM-RS (e.g., symbols 9 and 11).

Embodiments contemplate HARQ-ACK reporting with one or more, or multiple TTI durations.

One or more techniques contemplate how the WTRU may report HARQ-ACK in a subframe, for example in scenarios in which the TTI duration of previous transmissions may be determined in a dynamic manner, among other scenarios.

In some techniques, perhaps for example for a given subframe where HARQ-ACK may be transmitted, among other scenarios, the WTRU may determine that HARQ-ACK information is reported for one or more, or every, possible transport block associated to any TTI duration that could have been transmitted in a previous subframe according to its HARQ timing and/or semi-static configuration (e.g., perhaps irrespective of whether a transmission actually took place). For example, in subframe n the WTRU may report HARQ-ACK for one or more of the following:

Transport blocks associated to a first TTI duration (e.g. 1 ms) that may have been received in subframe n−k1 (e.g. k1=4); and/or Transport blocks associated to a second TTI duration (e.g. 0.5 ms) that may have been received in subframe n−k2 (e.g. k2=2) and/or in a specific portion of subframe n−k2 (e.g. the first time slot).

In scenarios in which the WTRU might not detect a transmission for a given transport block, the WTRU may report NACK and/or DTX for this transport block.

The WTRU may provide an indication of the TTI duration(s) associated to the transport block or set of transport blocks for which HARQ-ACK information is reported in the subframe. In some techniques, the indication may be for the subframe(s) in which the transport block(s) were received. For example, the indication may have a first value when HARQ-ACK information is provided for transport blocks associated to a first TTI duration, may have a second value when HARQ-ACK information is provided for transport blocks associated to a second TTI duration, and/or may have a third value when HARQ-ACK information is provided for transport blocks of any TTI duration.

The WTRU may determine that HARQ-ACK information is reported for a selected subset of transport blocks. The selection may be based on one or more priority criteria, which may include one or more of:

The TTI duration associated with a transport block. For example, priority may be higher for a smaller TTI duration;

The time elapsed since the initial HARQ transmission of a transport block. For example, priority may be higher for a transport block for which the start of initial HARQ transmission was earlier;

A redundancy version, retransmission sequence number, and/or the number of HARQ transmissions for the transport block;

The type of transport channel over which the transport block was transferred. For example, priority may be higher for a transport channel that may be defined for the purpose of enabling low latency and/or highly reliable communication;

The type of physical control channel and/or physical data channel that may be used for the transmission of the transport block;

At least one transmission parameter associated to the transport block, such as for example a parameter corresponding to a device-to-device transmission and/or a transmission to or from a network; and/or The MAC instance, or the cell group associated to the transport block.

Systems and methods may be provided for reduced TTI Duration PUCCH. Given that reduced TTI PDSCH may lead to an increase in the number of independent PDSCH assignments in any subframe, an increase in PUCCH resources may accommodate the feedback. The OFDM symbols used for either the ECCEs of the EPDCCH and/or the PDSCH itself may indicate to the WTRU the symbols where PUCCH may be transmitted in the UL. For example, if time-slot based EPDCCH/PDSCH is used, then an assignment in a first (or second) time slot may use PUCCH feedback using the first (or second) time slot (e.g., only the first (or second) time slot) of the appropriate feedback subframe. This may enable two PDSCH assignments in one or more, or each, of the time slots of a single subframe, one or more, or each, mapping to the same PUCCH resources (e.g., in terms of PUCCH RB location and/or cyclic shift and/or orthogonal cover code) may be orthogonalized by one or more, or each, utilizing a single time-slot.

Figure 6:
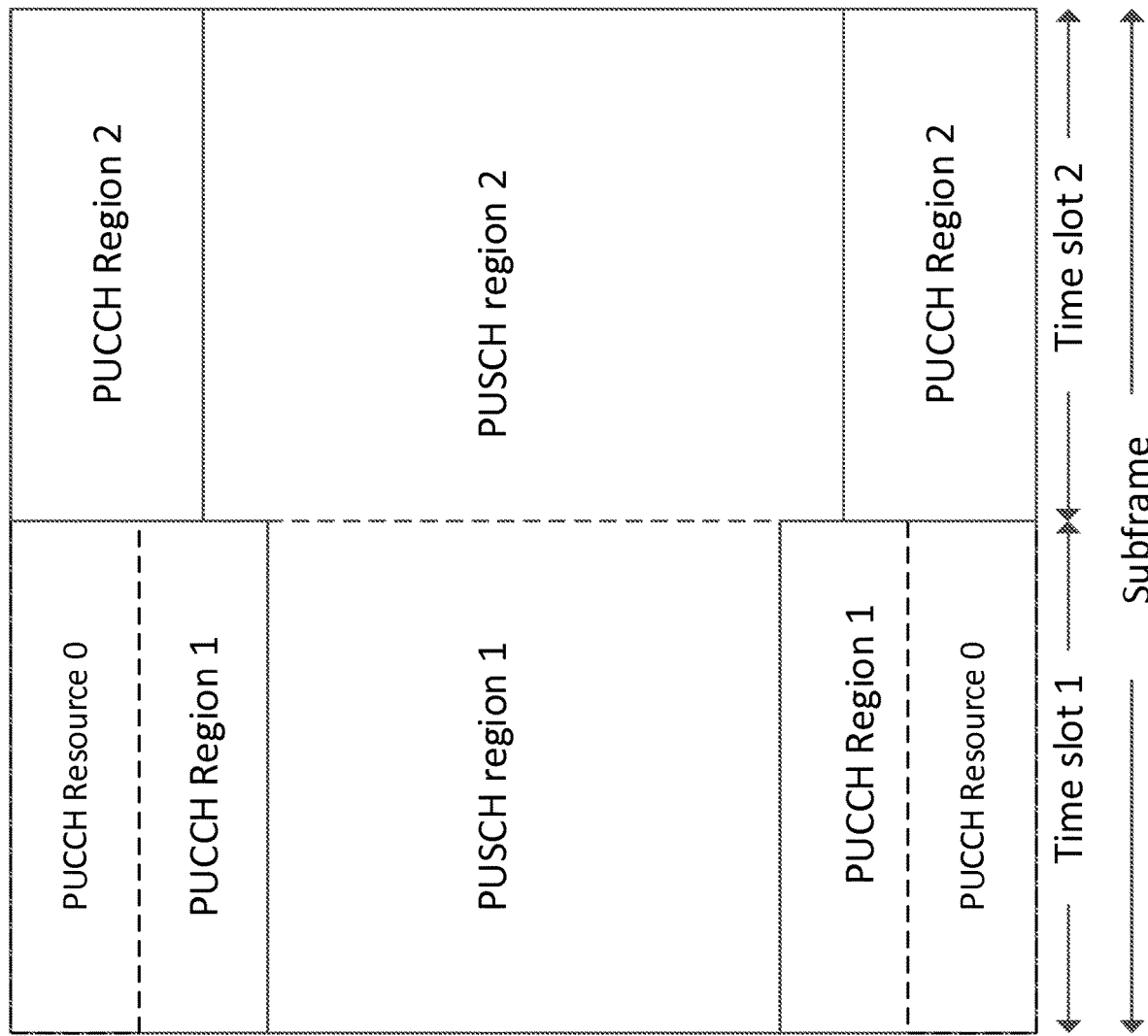
FIG. 6 depicts an example PUCCH transmitted in a single time slot using two resource blocks (RB's) and a full time slot that that may be used in one or more embodiments.
Figure 7:
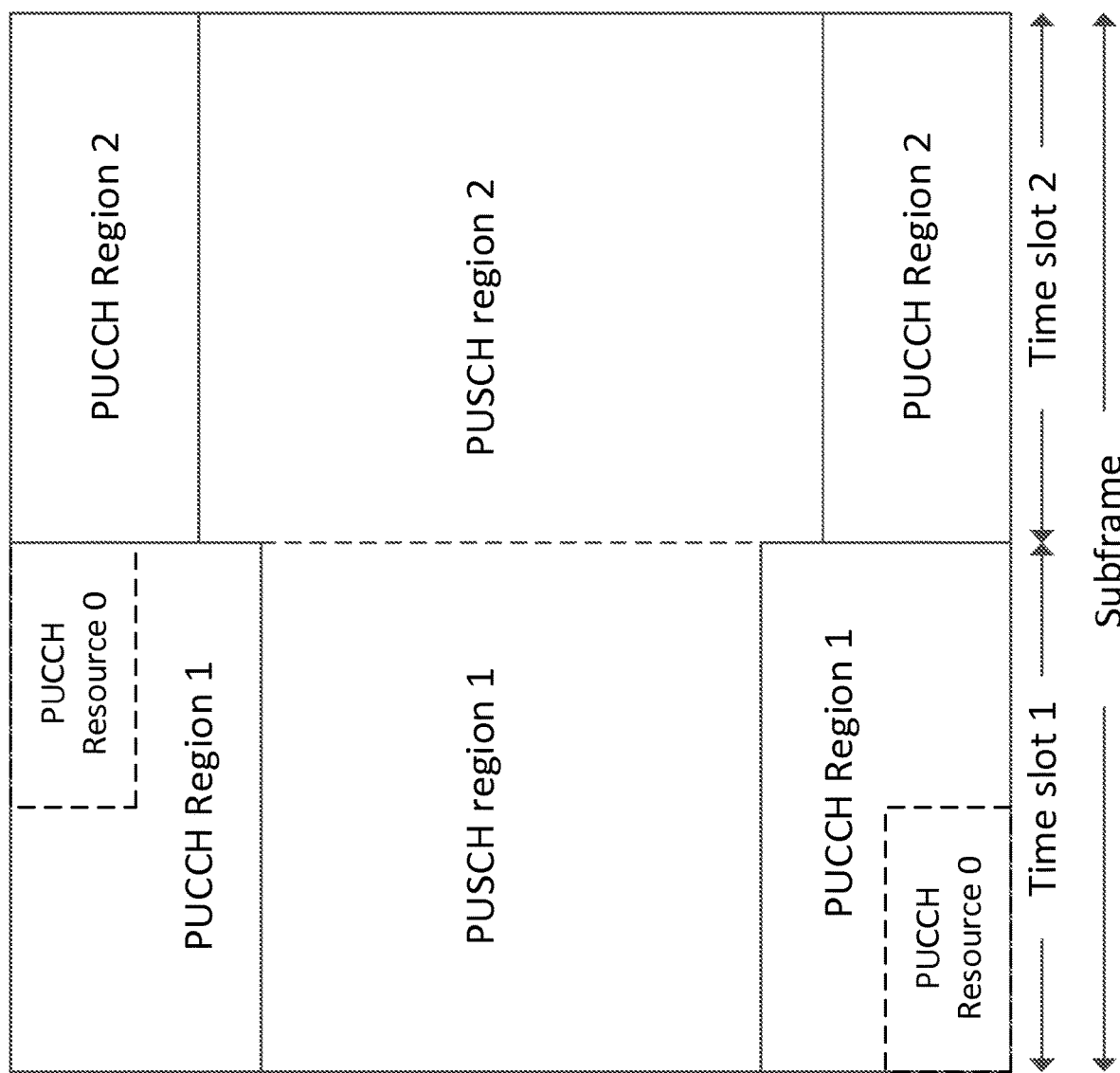
FIG. 7 depicts an example PUCCH transmitted in a single time slot transmitted over half of the time slot and over two RBs that that may be used in one or more embodiments.

The PUCCH may be located at the edges of the overall available spectrum. This may maximize frequency diversity. The same SC-FDMA symbols may be reused to transmit PUCCH at both edges of the overall bandwidth. For example, in single time-slot TTI duration, PUCCH format 1 can repeat the same data in two RBs located at one or more, or each, edge of the available bandwidth and in the same time slot, e.g., as shown for example in FIG. 6. Cyclic shift and OCC sequence randomization may be defined per RB of PUCCH, e.g., rather than per time slot. The PUCCH resource may be transmitted at the edges of the bandwidth and may occupy half (e.g., only half) of the reduced TTI subset of symbols in a similar manner as for subframe TTI duration (e.g., as in FIG. 7). Legacy PUCCH format 2 and 3 may not repeat the same transmissions at the edges of the available bandwidth. Nevertheless, similar to single time-slot TTI PUCCH format 1, single time-slot TTI PUCCH format 2 and/or 3 may use two RBs, one or more, or each, located at the edge of the available bandwidth and/or in the same time slot. For PUCCH format 2 and/or 3, the RBs at one or more, or each edge of the same time slot might not be a repeat of the same data, but may instead include different UCI bits.

A feedback report on a PUCCH may be repeated over one or more, or multiple, PUCCH resources, perhaps for example in some techniques within one legacy subframe. This may enable the eNB to achieve faster retransmission of data (e.g., when useful). For example, perhaps if a NACK is detected in a first transmission of a PUCCH, among other scenarios, the eNB may prepare for a retransmission in the next DL subframe.

Disclosed methods and systems apply to PDSCH DM-RS. Similar DM-RS features may be useful for PDSCH similar to those presented herein for EPDCCH. PDSCH may use up to 8 transmission ports. The short TTI duration PDSCH may enable DM-RS for up to 8 transmission ports. In single time-slot TTI duration, the use of OCC and frequency multiplexing may enable the DM-RS to support up to 4 ports. In order to increase the capacity of the DM-RS, the DM-RS might not be repeated every 5th subcarrier within an RB. For example, the DM-RS for ports 0 and 1 may be transmitted in subcarriers 1, 11, and the DM-RS for ports 4 and 6 may be transmitted in subcarrier 6. The DM-RS for ports 2 and 3 may be transmitted in subcarriers 0 and 10, and the DM-RS for ports 5 and 7 may be transmitted in subcarrier 5. RB bundling in the frequency domain may be used in order to have the total number of subcarriers for one or more, or each, DM-RS ports to remain constant with pairs of RB. For example, the DM-RS for ports 0 and 1 may be transmitted in subcarriers 1, 11 of a first RB and subcarrier 6 of a second RB. The DM-RS for ports 4 and 6 may be transmitted in subcarrier 6 of a first RB and subcarriers 1 and 11 of a second RB. The DM-RS for ports 2 and 3 may be transmitted in subcarriers 0 and 10 of a first RB and subcarrier 5 of a second RB. And the DM-RS for ports 5 and 7 may be transmitted in subcarrier 5 of a first RB and subcarriers 0 and 10 of a second RB. The DM-RS may occupy more subcarriers than in full subframe TTI. For example, the DM-RS of ports 0 and 1 may be located in subcarriers 1 and 7, the DM-RS ports 2 and 3 may be located in subcarriers 0 and 6, the DM-RS of ports 4 and 6 may be located in subcarriers 4 and 10 and the DM-RS of ports 5 and 7 may be located in subcarriers 3 and 9.

Disclosed methods and systems may enable short TTI for UL-SCH. Disclosed methods and systems may relate to scheduling short TTI UL-SCH. Reduced TTI UL-SCH scheduling may be achieved by using EPDCCH as described herein. PDCCH may be used to grant PUSCH resources to a WTRU. The (E)PDCCH located at the beginning of a subframe may be used to grant PUSCH resources in a shortened TTI subset of symbols within subframe n+i. The timing of the scheduled grant may be defined as n+i, where "n" can be the subframe number where the (E)PDCCH is transmitted and "i" is a predetermined offset measured in subframes. "n" may represent a counter of shortened TTI subset of symbols of any pre-configured channel's TTI duration. For example, the shortened TTI duration of the (E)PDCCH channel may be used as the counter. And "i" can be a predetermined offset measured in shortened TTI subset of symbols (e.g., also of a pre-configured channel's TTI duration). For example, for time-slot TTI duration, one or more, or each, time slot within a frame may be numbered and/or the time-slot used for (E)PDCCH may be used for n while the value of i can be 4 time slots. A combination of interpretation of n (e.g., subframe number, time slot number, OFDM symbol number of a first symbol of a pre-configured channel) and of i (e.g., subframes, time slots, OFDM symbols) may be used. A WTRU may be statically and/or semi-statically configured with an interpretation of the resource grant timing A WTRU may be configured with an interpretation of the resource grant timing, perhaps for example upon being granted resources for shortened TTI PUSCH transmissions, among other scenarios.

The (E)PDCCH located at the beginning of the subframe may (e.g., explicitly) indicate to the WTRU the TTI subset of symbols for which a scheduling grant is relevant. A parameter of the (E)PDCCH located at the beginning of the subframe may indicate the relevant TTI subset of symbols. One or more of the following may be configured to indicate the relevant short TTI subset of symbols of a scheduling grant: the first (or second) CCE of the DCI, the DCI Format, the PHICH resources configured for the HARQ ACK-NACK, and/or the MCS. Some MCS may be reserved for specific short TTI subset of symbols.

Parameters for an UL transmission in a first shortened TTI may be reused for an UL transmission in a second shortened TTI. For example, UL grant parameters such as UL power control may remain constant for an entire legacy subframe and/or may be reused for one or more, or multiple, shortened TTIs. For example, UL power control parameters for a second shortened TTI transmission in a legacy subframe may be based on a function of the UL power control parameters for a first shortened TTI transmission, perhaps for example in the same legacy subframe, among other scenarios. The relationship on such parameters between two shortened TTI transmissions may be a function of the content of the shortened TTI. For example, perhaps if two adjacent shortened TTIs are granted for PUSCH data transmissions, they may reuse some parameters (e.g. UL power control, MCS, precoding, RB assignment, cyclic shift for DM-RS and/or OCC index, and/or downlink assignment index). For example, perhaps if the two adjacent shortened TTIs are granted, a first (e.g., solely) for data and/or a second for data and/or UCI, the relationship between parameters may be different. For example, the UL power control of a data TTI (e.g. a data-only TTI) may not be reused identically for the data and/or UCI TTI.

One or more techniques may enable PHICH resource allocation. One or more, or each, transport block and TTI may have an independent PHICH resource. Perhaps for example in order to enable shortened TTI duration for UL-SCH, among other scenarios, a WTRU may be scheduled with one or more, or multiple, PUSCH whose TTI duration is less than a subframe (e.g., within a subframe). Such WTRUs may be assigned with one or more, or multiple, PHICH resources (e.g., one per transport block and per short TTI subset of symbols) to be fed back in subframe n+i. The PHICH resources (e.g., number of PHICH group, number of orthogonal sequence, RE resources in frequency and OFDM symbol) may be determined from one or more of: the first or second resource block on which the corresponding PUSCH transmission occurred, the first or second OFDM symbol on which corresponding PUSCH transmission occurred, the time-slot on which corresponding PUSCH transmission occurred, the UL DM-RS cyclic shift, and/or whether the short TTI transmission occurred on the first or the second slot of the subframe.

The PHICH may be transmitted in the same TTI subset of symbols as the (E)PDCCH used to grant the PUSCH resources. For example, if time-slot TTI duration is assumed, and the (E)PDCCH used to grant a PUSCH transmission is located in the first time slot of subframe n, then the PHICH associated to that PUSCH transmission may be located in the first time slot of subframe n+8.

The PHICH may be transmitted in a short TTI subset of symbols in subframe n+4, and the location (in terms of OFDM symbol) may be pre-configured or may be determined as part of the function to determine the PHICH resource for one or more, or each, PUSCH.

The PHICH for one or more, or multiple, TTIs within a subframe may collide. In such scenarios, among others, a WTRU may bundle and/or multiplex PHICH values into the same PHICH resources.

The timing of the PHICH may be defined as n+i where n may be the subframe number where the (E)PDCCH is transmitted or the subframe number where the PUSCH is transmitted, and "i" is a predetermined offset measured in subframes. "n" may represent a counter of shortened TTI subset of symbols of a pre-configured channel's TTI duration. For example, the shortened TTI duration of the (E)PDCCH transmission (or PUSCH transmission) may be used as the counter. And "i" may be a predetermined offset measured in shortened TTI subset of symbols (also of a pre-configured channel's TTI duration). For example, for time-slot TTI duration, one or more, or each, time slot within a frame may be numbered and the time-slot used for (E)PDCCH (or PUSCH) may be used for "n," while the value of "i" can be 8 (or 4) time slots. A combination of interpretation of "n" (e.g., subframe number, time slot number, OFDM symbol number of a first symbol of a pre-configured channel) and of "i" (e.g. subframes, time slots, OFDM symbols) may be used. A WTRU may be statically or semi-statically configured with an interpretation of the PHICH timing. A WTRU may be configured with an interpretation of the PHICH timing upon being granted resources for shortened TTI PUSCH transmissions.

A WTRU may expect (e.g., may only expect) PHICH transmission for a subset of shortened TTI PUSCH transmissions (e.g., all shortened TTI PUSCH transmissions) within a subframe. For other PUSCH transmissions, the WTRU may assume ACK unless it is given a new grant for adaptive retransmissions. For example, for time-slot TTI duration, PUSCH transmissions in a first time slot (e.g., only PUSCH transmissions in a first time slot) may have PHICH resources, whereas PUSCH transmissions in a second time slot may assume ACK unless resources are granted for retransmission.

The methods and systems provide frequency diversity of short TTI PUSCH transmissions. In order to achieve frequency diversity of PUSCH transmissions, frequency hopping may be used. Frequency hopping may be used by dividing the short TTI subset of symbols into two groups, and mapping different shortened virtual resource blocks to one or more, or each, group. The shortened virtual resource blocks may be mapped to different shortened physical resource blocks using different subcarriers and increasing frequency diversity. For example, a PUSCH transmitted in a first time-slot may use two shortened virtual resource blocks: a first mapped to symbols 0, 1, 2 and a second mapped to symbols 4, 5, 6. In this example, UL DM-RS may be transmitted in symbol 3. The mapping to shortened physical resource blocks may enable frequency diversity by ensuring that a single PUSCH short resource block pair (e.g., in this example a short resource block pair consists of 7 OFDM symbols) is mapped to different short physical resource blocks using different subcarriers. For demodulation, the UL DM-RS in symbol 3 may be used to demodulate either short resource block located in symbols 0, 1, 2 or short resource block located in symbols 4, 5, 6.

Short PUSCH frequency hopping can be achieved by repeating a short RB pair in different subcarriers. For example, a time-slot TTI PUSCH may be transmitted in a first time slot in a first physical resource block pair, as well as, in a first time slot in a second physical resource block pair.

The systems may use UL DM-RS short TTI PUSCH. To achieve full UL DM-RS capacity, two UL DM-RS symbols may be used per RB pair (where an RB pair is defined as the TTI duration). Two symbols may be assigned for UL DM-RS transmission within a short TTI subset of symbols. These symbols may be pre-configured and/or semi-statically configured and/or may be indicated in a grant assigning PUSCH resources. For example, in time-slot TTI duration, a WTRU assigned with PUSCH resources in a first time slot may transmit UL DM-RS in symbols 2 and 5 (or any other configured pair of symbols).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
a memory; and
a processor, the processor configured to:
- receive a downlink control channel transmission;
- determine a downlink control information (DCI) format associated with the downlink control channel transmission;
- determine a first duration, wherein the first duration is associated with a first transmission associated with a physical downlink shared channel (PDSCH), and wherein the first duration is determined based at least on the determined DCI format;
- determine a transport block size (TBS) associated with the first transmission, wherein the TBS is determined based at least on the first duration;
- determine a Physical Uplink Control Channel (PUCCH) resource associated with Hybrid Automatic Repeat Request (HARQ) feedback information based on an indicator in DCI, wherein the PUCCH resource is associated with a second duration, and wherein the second duration is determined based at least on higher layer signaling; and
- send HARQ feedback information using the PUCCH resource.

2. The WTRU of claim 1, wherein the first duration associated with the first transmission associated with the PDSCH is associated with a first time instance, and wherein the processor is further configured to reuse the first duration, associated with a second time instance, for a second transmission associated with the PDSCH.

3. The WTRU of claim 1, wherein the processor is further configured to: receive the first transmission; and process the first transmission based on the TBS.

4. The WTRU of claim 3, wherein being configured to process the received first transmission comprises being configured to determine HARQ feedback associated with the first transmission, and wherein the sent HARQ feedback information comprises the determined HARQ feedback.

5. The WTRU of claim 1, wherein the DCI is received via the downlink control channel transmission.

6. A method of communication performed by a wireless transmit/receive unit (WTRU), the method comprising:
- receiving a downlink control channel transmission and determining a downlink control information (DCI) format associated with the downlink control channel transmission;
- determining a first duration, wherein the first duration is associated with a first transmission associated with a physical downlink shared channel (PDSCH), and wherein the first duration is determined based at least on the determined DCI format
- determining a transport block size (TBS) associated with the first transmission, wherein the TBS is determined based at least on the first duration;
- determining a Physical Uplink Control Channel (PUCCH) resource associated with Hybrid Automatic Repeat Request (HARQ) feedback information based on an indicator in DCI, wherein the PUCCH resource is associated with a second duration, and wherein the second duration is determined based at least on higher layer signaling; and
- sending HARQ feedback information using the PUCCH resource.

7. The method of claim 6, wherein the first duration associated with the first transmission associated with the PDSCH is associated with a first time instance, and wherein the method further comprises reusing the first duration, associated with a second time instance, for a second transmission associated with the PDSCH.

8. The method of claim 6, further comprising receiving the first transmission; and processing the first transmission based on the TBS.

9. The method of claim 8, further comprising determining HARQ feedback associated with the first transmission, and wherein the HARQ feedback information comprises the HARQ feedback.

10. The method of claim 6, wherein the DCI is received via the downlink control channel transmission.

* * * * *